United States Patent
Almgren et al.

(10) Patent No.: US 12,019,788 B2
(45) Date of Patent: Jun. 25, 2024

(54) METHOD AND SYSTEM FOR REGISTERING DIGITAL DOCUMENTS

(71) Applicant: ENIGIO AB, Stockholm (SE)

(72) Inventors: Hans Almgren, Täby (SE); Lars Hansén, Stockholm (SE); Krisztian Mangold, Vendelsö (SE); Mats Stengård, Värmdö (SE)

(73) Assignee: ENIGIO AB, Stockholm (SE)

( * ) Notice: Subject to any disclaimer, the term of this patent is extended or adjusted under 35 U.S.C. 154(b) by 0 days.

(21) Appl. No.: 18/280,051

(22) PCT Filed: Feb. 28, 2022

(86) PCT No.: PCT/SE2022/050205
§ 371 (c)(1),
(2) Date: Sep. 1, 2023

(87) PCT Pub. No.: WO2022/186755
PCT Pub. Date: Sep. 9, 2022

(65) Prior Publication Data
US 2024/0037284 A1    Feb. 1, 2024

(30) Foreign Application Priority Data
Mar. 1, 2021    (SE) .................................... 2150227-3

(51) Int. Cl.
*G06F 21/64* (2013.01)
*G06F 40/197* (2020.01)
*H04L 9/32* (2006.01)

(52) U.S. Cl.
CPC ............ *G06F 21/64* (2013.01); *G06F 40/197* (2020.01); *H04L 9/3236* (2013.01)

(58) Field of Classification Search
CPC ....... G06F 21/64; G06F 40/197; H04L 9/3236
See application file for complete search history.

(56) References Cited

U.S. PATENT DOCUMENTS

| | | | | |
|---|---|---|---|---|
| 5,465,299 | A | * | 11/1995 | Matsumoto ........... H04L 9/3236 713/176 |
| 8,856,640 | B1 | * | 10/2014 | Barr ........................ G06F 21/31 715/255 |

(Continued)

FOREIGN PATENT DOCUMENTS

WO    2018203817 A1    11/2018

OTHER PUBLICATIONS

International Search Report from corresponding International Application No. PCT/SE2022/050205, dated Apr. 28, 2022, 5 pages.

(Continued)

*Primary Examiner* — J. Brant Murphy
(74) *Attorney, Agent, or Firm* — Tucker Ellis LLP

(57) ABSTRACT

Method for registering and updating an electronically stored and versioned alpha digital document (A) in a digital document register by storing, for each version, not the document but a public ownership key; a digital document hash value; and a digital document signature. The invention is characterised by the steps a) providing a first document version, defined in a document description language to have a defined rendered graphic representation; b) registering said first version; c) providing a second document version by adding a reversibly added part to said first document version, said second version comprising a second set of metadata; and d) registering said second version, in that said second metadata is embedded in the second version without affecting said graphic representation, in that at least a part of the reversibly added part can be unambiguously generated based on the second metadata, and in that the registering in step d comprises storing a hash of the second metadata. The invention also relates to a system.

20 Claims, 21 Drawing Sheets

(56) References Cited

U.S. PATENT DOCUMENTS

| | | | | |
|---|---|---|---|---|
| 10,163,080 | B2* | 12/2018 | Chow | G06Q 50/08 |
| 10,803,049 | B2* | 10/2020 | Almgren | H04L 9/321 |
| 11,233,657 | B2 | 1/2022 | Almgren | |
| 2009/0019549 | A1* | 1/2009 | Reid | H04L 9/088 |
| | | | | 726/27 |
| 2016/0188907 | A1* | 6/2016 | Almgren | G06F 21/64 |
| | | | | 713/176 |
| 2017/0048216 | A1* | 2/2017 | Chow | H04L 63/0876 |
| 2017/0364701 | A1* | 12/2017 | Struttmann | G06F 21/6218 |
| 2018/0219685 | A1* | 8/2018 | Deery | H04L 9/3236 |
| 2019/0044727 | A1* | 2/2019 | Scott | H04L 9/0891 |
| 2020/0210519 | A1* | 7/2020 | Wang | H04L 9/3247 |
| 2020/0258176 | A1* | 8/2020 | Gibson | G06Q 10/103 |
| 2020/0279325 | A1* | 9/2020 | Snow | G06Q 40/03 |
| 2020/0320620 | A1* | 10/2020 | Snow | G06Q 50/16 |

OTHER PUBLICATIONS

Adobe Systems Incorporated, "Document management—Portable document format—Part 1: PDF 1.7," PDF 32000-1:2008, First Edition, Jul. 1, 2008, 756 pages.

Written Opinion of the ISA from corresponding International Application No. PCT/SE2022/050205, dated Apr. 28, 2022, 5 pages.

Written Opinion of the IPEA from corresponding International Application No. PCT/SE2022/050205, dated Jan. 26, 2023, 5 pages.

International Preliminary Report on Patentability from corresponding International Application No. PCT/SE2022/050205, dated Apr. 11, 2023, 13 pages.

* cited by examiner

Fig. 2a

STANDARD PROMISSORY NOTE

1. THE PARTIES. On February 1 2021, Enigio with Mats Stengård acting as Vice President, referred to as the "Borrower",

HAS RECEIVED AND PROMISES TO PAY:

Loan Lending Ltd with Joe Smith acting as President, referred to as the "Lender", the sum of $5,000.00 US Dollars, referred to as the "Borrowed Money", with interest accruing on the unpaid balance at a rate of 8.5 percent (%) per annum, referred to as the "Interest Rate", beginning on February 1 2021 under the following terms and conditions:

2. PAYMENTS. The full balance of this Note, including any accrued interest and late fees, is due and payable on February 28 2022, referred to as the "Due Date". The Borrowed Money shall be repaid via installments every month in the following schedule:

The Borrowed Money shall be repaid via equal installments on the Twenty-Fifth (25th) of every month beginning on February 25 2021 with any remaining balance payable on the Due Date.

If the Lender does not receive payment on-time for any installment there shall be a late payment fee equal to 25 percent (%) per annum of the installment amount, not the entire principal balance unless it is the last payment, every occurrence of payment being late. No matter how late the payment is made this late fee may only be charged once per occurrence.

In addition, money that is not paid by the Borrower on-time for any installment will continue to be charged the Interest Rate stated in this Note.

3. SECURITY. There shall be no Security put forth by the Borrower in this promissory note.

4. INTEREST DUE IN THE EVENT OF DEFAULT. In the event the Borrower fails to pay the note in full on the Due Date, the unpaid principal shall accrue interest at the maximum rate allowed by law until the Borrower is no longer in default.

5. ALLOCATION OF PAYMENTS. Payments shall be first credited to any late fees due, then to interest due and any remainder will be credited to principal.

6. PREPAYMENT. Borrower may prepay this Note without penalty.

7. ACCELERATION. If the Borrower is in default under this Note or is in default under another provision of this Note, and such default is not cured within the minimum allotted time by law after written notice of such default, then Lender may, at its option, declare all outstanding sums owed on this Note to be immediately due and payable.

8. ATTORNEYS' FEES AND COSTS. Borrower shall pay all costs incurred by Lender in collecting sums due under this Note after a default, including reasonable attorneys' fees. If Lender or Borrower sues to enforce this Note or obtain a declaration of its rights hereunder, the prevailing party in any such proceeding shall be entitled to recover its reasonable attorneys' fees and costs incurred in the proceeding (including those incurred in any bankruptcy proceeding or appeal) from the non-prevailing party.

Fig. 2a (continued)

9. WAIVER OF PRESENTMENTS. Borrower waives presentment for payment, notice of dishonor, protest and notice of protest.

10. NON-WAIVER. No failure or delay by Lender in exercising Lender's rights under this Note shall be considered a waiver of such rights.

11. SEVERABILITY. In the event that any provision herein is determined to be void or unenforceable for any reason, such determination shall not affect the validity or enforceability of any other provision, all of which shall remain in full force and effect.

12. INTEGRATION. There are no verbal or other agreements which modify or affect the terms of this Note. This Note may not be modified or amended except by a written agreement signed by Borrower and Lender.

13. CONFLICTING TERMS. The terms of this Note shall have authority and precedence over any conflicting terms in any referenced agreement or document.

14. NOTICE. Any notices required or permitted to be given hereunder shall be given in writing and shall be delivered (a) in person, (b) by certified mail, postage prepaid, return receipt requested, (c) by facsimile, or (d) by a commercial overnight courier that guarantees next day delivery and provides a receipt, and such notices shall be made to the parties at the addresses listed below.

15. GUARANTORS. There shall be no person or entity, under the terms of this Note, that shall be responsible for the payment, late fees, and any accrued interest other than the Borrower.

16. EXECUTION. The Borrower executes this Note as a principal and not as a surety. If there is a Co-Signer, the Borrower and Co-Signer shall be jointly and severally liable under this Note.

17. GOVERNING LAW. This note shall be governed under the laws in the State of New York.

With my signature below, I affirm that I have read and understand this promissory note.

Borrower's Signature _____
Enigio with Mats Stengård acting as Vice President

Lender's Signature _____
By Joe Smith
Loan Lending Ltd with Joe Smith acting as President

1. DOCUMENT CREATED | 2021-02-25T09:52:32.108Z trace:original id   d9a5ae8b19028fa95124d9945122fcd8356e3ad9ba71e02b58ab441297cf3f78

AGREEMENT TITLE
   Promnote 210130-1

AGREEMENT TYPE
   Generic

REQUIRED SIGNERS
   Bob Smith
      Role Tester
      ID mast@enigio.com
      ID Type E-mail
      Email mast@enigio.com INITIAL PDF
   File name
      New-York-Loan-Agreement-promissory-note_2021_01_30.pdf
   Hash
      69cfc603bb557ac33657183539868054 2b72f09157da7fa31f4d39c3e8652ca0

Fig. 2b 2021-02-25

1. DOCUMENT CREATED | 2021-02-25T09:52:32.106Z trace:original id   d9a8ee8b19028fa35124d9945122fcd8356e3ad9ba71e02b96ab441297cf3f78

AGREEMENT TITLE
  Promnote 210130-1

AGREEMENT TYPE
  Generic

REQUIRED SIGNERS
  Bob Smith
  Role  Tester
  ID  mast@enigio.com
  ID Type  E-mail
  Email  mast@enigio.com INITIAL PDF
  File name
    New-York-Loan-Agreement-promissory-note_2021_01_30.pdf
  Hash
    89cfc803bb857ac33867l835398880542b72f09l57da77a31f4d39c3e8852ca0

---

2. SIGNATURE AMENDMENT | 2021-02-25T09:53:28.540Z

SIGNATURE PROVIDER
SIGNICAT
Trusted Digital Identity

mast@enigio.com | Bob Smith

Fig. 2c 2021-02-25

1. DOCUMENT CREATED | 2021-02-25T09:52:32.106Z trace:original id  d9a6ae8b19029fa95124d9945122fcd8356e3ad9ba71e02b95ab441297cf3f78

AGREEMENT TITLE
  Promnote 210130-1

AGREEMENT TYPE
  Generic

REQUIRED SIGNERS
  Bob Smith
   Role  Tester
   ID  mast@eniglo.com
   ID Type  E-mail
   Email  mast@eniglo.com INITIAL PDF
  File name
   New-York-Loan-Agreement-promissory-note_2021_01_30.pdf
  Hash
   89cfc893bb657ac33867183539868054227bf2f09157da7fa3lf4d39c3e8652ca0

---

2. SIGNATURE AMENDMENT | 2021-02-25T09:53:26.540Z

SIGNATURE PROVIDER

SIGNICAT
Trusted Digital Identity™ mast@eniglo.com | Bob Smith

---

3. TRANSFER | 2021-02-25T09:55:05.819Z

I hereby transfer possession of this original to Alice Smith.

Fig. 2d 2021-02-25

1. DOCUMENT CREATED | 2021-02-25T09:52:32.106Z trace:original id    d9a8ae8b19029fa95124d9945122fcd8358e3ad9ba71e02b98ab441297cf3f78

AGREEMENT TITLE
   Promnote 210130-1

AGREEMENT TYPE
   Generic

REQUIRED SIGNERS
   Bob Smith

Role  Tester
   ID  mast@enigio.com
   ID Type  E-mail
   Email  mast@enigio.com

INITIAL PDF

File name
   New-York-Loan-Agreement-promissory-note_2021_01_30.pdf

Hash
   89cfc603bb657ac33687f835398680542b72f09157da7fa31f4d39c3e8652ca0

---

2. SIGNATURE AMENDMENT | 2021-02-25T09:53:28.540Z

SIGNATURE PROVIDER

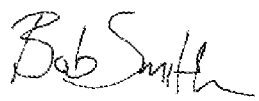

SIGNICAT
Trusted Digital Identity™ mast@enigio.com | Bob Smith

---

3. TRANSFER | 2021-02-25T09:55:05.819Z

I hereby transfer possession of this original to Alice Smith.

---

4. AMENDMENT | 2021-02-25T09:56:41.034Z

AGREEMENT TERMS
     I'm writing on my original.

// Alice Smith

Fig. 2e

5. TRANSFER | 2021-02-25T10:05:42.228Z

Transferring possession back to Bob Smith

5. TRANSFER | 2021-02-25T10:05:42.228Z

Transferring possession back to Bob Smith

---

6. AMENDMENT | 2021-02-25T10:06:52.708Z

AGREEMENT TERMS
  New terms to sign!

REQUIRED SIGNERS
  Bob Smith
    Role Tester
    ID mast@enigio.com
    ID Type E-mail
    Email mast@enigio.com Alice Smith
    Role Tester
    ID mats.stengard@enigio.com
    ID Type E-mail
    Email mats.stengard@enigio.com

Fig. 2g

5. TRANSFER | 2021-02-25T10:05:42.228Z

Transferring possession back to Bob Smith

---

6. AMENDMENT | 2021-02-25T10:08:52.706Z

AGREEMENT TERMS
  New terms to sign!

REQUIRED SIGNERS
  Bob Smith
    Role  Tester
    ID  mast@enigio.com
    ID Type  E-mail
    Email  mast@enigio.com
  Alice Smith
    Role  Tester
    ID  mats.stengard@enigio.com
    ID Type  E-mail
    Email  mats.stengard@enigio.com

---

7. SIGNATURE AMENDMENT | 2021-02-25T10:12:07.131Z

SIGNATURE PROVIDER
SIGNICAT
Trusted Digital Identity

mast@enigio.com | Bob Smith

Fig. 2h

5. TRANSFER | 2021-02-25T10:05:42.228Z

Transferring possession back to Bob Smith

---

6. AMENDMENT | 2021-02-25T10:06:52.706Z

AGREEMENT TERMS
New terms to sign!

REQUIRED SIGNERS

Bob Smith
- Role  Tester
- ID  mast@enigio.com
- ID Type  E-mail
- Email  mast@enigio.com Alice Smith
- Role  Tester
- ID  mats.stengard@enigio.com
- ID Type  E-mail
- Email  mats.stengard@enigio.com

---

7. SIGNATURE AMENDMENT | 2021-02-25T10:12:07.131Z

mast@enigio.com | Bob Smith

SIGNATURE PROVIDER

SIGNICAT
Trusted Digital Identity

---

8. SIGNATURE AMENDMENT | 2021-02-25T10:13:34.006Z

mats.stengard@enigio.com | Alice Smith

SIGNATURE PROVIDER

SIGNICAT
Trusted Digital Identity

Fig. 2i

5. TRANSFER | 2021-02-25T10:05:42.228Z

Transferring possession back to Bob Smith

---

6. AMENDMENT | 2021-02-25T10:06:52.706Z

AGREEMENT TERMS
  New terms to sign!

REQUIRED SIGNERS
  Bob Smith
    Role Tester
    ID mast@enigio.com
    ID Type E-mail
    Email mast@enigio.com
  Alice Smith
    Role Tester
    ID mats.stengard@enigio.com
    ID Type E-mail
    Email mats.stengard@enigio.com

---

7. SIGNATURE AMENDMENT | 2021-02-25T10:12:07.131Z

SIGNATURE PROVIDER
SIGNICAT
Trusted Digital Identity™

mast@enigio.com | Bob Smith

---

8. SIGNATURE AMENDMENT | 2021-02-25T10:13:34.006Z

SIGNATURE PROVIDER
SIGNICAT
Trusted Digital Identity™

mats.stengard@enigio.com | Alice Smith

---

9. TRANSFER | 2021-02-25T10:14:46.610Z

I hereby transfer possession to Alice Smith

Fig. 2j

10. INVALIDATION | 2021-02-25T13:33:45.245Z
Invalidated, document no longer legal

```
########################################################################
########## THIS IS A TEST DOCUMENT - NO CONTENT IS LEGALLY BINDING. #########
########################################################################
# By signing the content in this digital original document and amendments hereto,
# using a digital signature, the signee accepts this digital original as the valid
# and legal bearer of its content. This document is a versioned digital original
# secured by the Enigio trace:original system.
# Since the document is registered in the trace:original public ledger, nothing
# may be altered or removed without this file losing its authenticity.
# All content is in YAML-format, cryptographically secured both in this file and
# by immutable references in the block-chained trace:original public ledger.
# Only those in possession of this trace:original file, or a copy thereof, have
# access to its business content.
# The authenticity of a trace:original file can be verified online as well as
# its consistency off-line, by using the appropriate software and algorithms as
# found at https://traceoriginal.com.
# Only the holder of the current and valid trace:original file, together with its
# current private key, is the party able to exercise the legal rights as described
# in the document. Furthermore, this current legal holder has the control of the
# document with the right to make amendments, facilitate the procedure of adding
# signatures, transfer ownership and invalidate the current digital original.
# If not stated otherwise, this digital document should be subject to the eIDAS
# regulation (EU) No 910/2014.
# Additional information can be found on https://traceoriginal.com.
########################################################################
Version:
 Schema: https://schema.traceoriginal.com/trace-original-en-schema-v1.3.json
 ContentType:
  - Schema: https://schema.traceoriginal.com/trace-original-agreement-en-schema-v1.1.json
  - Schema: https://schema.traceoriginal.com/trace-original-generic-text-en-schema-v1.1.json
Content:
 Reference: Promnote 210130-1
 Agreement type: Generic
 Required signers:
  - Role: Tester
    Name: Bob Smith
    ID: mast@enigio.com
    ID Type: E-mail
    Email: mast@enigio.com
 Initial Pdf:
   File name: New-York-Loan-Agreement-promissory-note_2021_01_30.pdf
   Hash: 69cfc603bb657ac336671835398680542b72f09157da7fa31f4d39c3e8652ca0
TechnicalDetails:
 LedgerURL: https://explorer.test.traceoriginal.com
 ContentHash: ce4dc7536a1133218177e090bdd67d273d896add79bc1e125acf21bc9a08b7a3
 OwnerKey: 025e1417a6a1dc2ba8c58806f2ac2ce87bb4ffcecd9f3d59911ecb35ab8d525e8b
 VersionKey: 3f95c23ffddb9d2c3ad3aef3bd894b35b9ab241453220cc71144b7c2e7c52176
 TraceOriginalId: d9a6ae8b19029fa95124d9945122fcd8356e3ad9ba71e02b96ab441297cf3f78
 DocumentTimestamp: 2021-02-25T09:52:32.106Z
```

Fig. 4b

Amendments:
  - Type: Signature amendment
    Content:
      Subject:
        ID: mast@enigio.com
        ID Type: E-mail
      Accepted: true
      Method: Signicat OTP
      Signature:
        Xades: |-
D94bWwgdmVyc2lvbj0iMS4wIiBlbmNvZGluZz0iVVRGLTgiPz48bHR2Okx0d
[...]
RzOk9iamVjdD4KPC9kczpTaWduYXR1cmU+PC9sdHY6THR2U2RvPg==
      TechnicalDetails:
        ContentHash: 9ada4f1d4e3241d37a44ebae2fc46866bbab67b5b6ad649060918eaa613db154
        OwnerKey: 025e1417a6a1dc2ba8c58806f2ac2ce87bb4ffcecd9f3d59911ecb35ab8d525e8b
        VersionKey: 79d75eff488a21f6da9ed2adc5cdd3c735edc04eb31286c74cb8ca7f6d810836
        DocumentTimestamp: 2021-02-25T09:53:28.540Z

Fig. 4c

- Type: Transfer
    Content: |
      I hereby transfer possession of this original to Alice Smith.
    TechnicalDetails:
      ContentHash: 6c7a843defc2000016256fc8bc7b971322def0b92eb4d61c09f7507e28d540f4
      OwnerKey: 02204c62e0706e270df86e4ca6c545d5f1188c94266b95a48024ab6e93b714bf63
      VersionKey: 1890c3c75abac7d38662f1c13e796ff35244ff26bb411b39cb78d2eeb0ca98e4
      DocumentTimestamp: 2021-02-25T09:55:05.819Z

Fig. 4d

- Type: Amendment
    Content:
      Agreement terms: |-
        I'm writing on my original.

// Alice Smith
    TechnicalDetails:
      ContentHash: 4e060ca6bb14bd404ed23f201871f1b0d410280fa91ce8287d466f7d490384fe
      OwnerKey: 02204c62e0706e270df86e4ca6c545d5f1188c94266b95a48024ab6e93b714bf63
      VersionKey: cd04f80ae83ed9ff8e17a83b82b8d255503755ecf34a54771fb92b39fa0c87e7
      DocumentTimestamp: 2021-02-25T09:56:41.034Z

Fig. 4e

- Type: Transfer
  Content: |
    Transferring possession back to Bob Smith
  TechnicalDetails:
    ContentHash: 2549f844ef8fbb69b07f9800f5fb67d08042a5b892afcc4587033f450035796f
    OwnerKey: 02e74ad2a2f21c00d9a41b1d9f3cc577a13ff991a5ec6196374f612b71a6fe0548
    VersionKey: 562468985078178a68bbd443d4a541465a852e72283a9eefb941390914e74b0d
    DocumentTimestamp: 2021-02-25T10:05:42.228Z

Fig. 4f

- Type: Amendment
  Content:
    Agreement terms: New terms to sign!
    Required signers:
      - Role: Tester
        Name: Bob Smith
        ID: mast@enigio.com
        ID Type: E-mail
        Email: mast@enigio.com
      - Role: Tester
        Name: Alice Smith
        ID: mats.stengard@enigio.com
        ID Type: E-mail
        Email: mats.stengard@enigio.com
  TechnicalDetails:
    ContentHash: 5d62a8563ae4b255d070e9183dc6b14287dfac88dcd552fab40cd15b112f6c68
    OwnerKey: 02e74ad2a2f21c00d9a41b1d9f3cc577a13ff991a5ec6196374f612b71a6fe0548
    VersionKey: fcd6d9c2b8b01d4d65135b8b83a3718235890f00960475e4b507a32eaba4ac53
    DocumentTimestamp: 2021-02-25T10:06:52.706Z

Fig. 4g

- Type: Signature amendment
  Content:
    Subject:
      ID: mast@enigio.com
      ID Type: E-mail
    Accepted: true
    Method: Signicat OTP
    Signature:
      Xades: |-
PD94bWwgdmVyc2lvbj0iMS4wIiBlbmNvZGluZ
[...]
plY3Q+CjwvZHM6U2lnbmF0dXJlPjwvbHR2Okx0dlNkbz4=
  TechnicalDetails:
    ContentHash: 43c1dd64835c3d85f1c3bebe987980931981b7a33e83de804d691cb0ce6ad1f9
    OwnerKey: 02e74ad2a2f21c00d9a41b1d9f3cc577a13ff991a5ec6196374f612b71a6fe0548
    VersionKey: 82659d2bf74328c761ce4b9fa6dfdc1bb0f76f7f57e94171756f278cda1046d8
    DocumentTimestamp: 2021-02-25T10:12:07.131Z

Fig. 4h

- Type: Signature amendment
  Content:
    Subject:
      ID: mats.stengard@enigio.com
      ID Type: E-mail
    Accepted: true
    Method: Signicat OTP
    Signature:
      Xades: |-
PD94bWwgdmVyc2lvbj0iMS4wIiBlbmM6U2
[...]
lnbmF0dXJlPjwvbHR2Okx0dlNkbz4=
  TechnicalDetails:
    ContentHash: b28168672c633cbc2008523693c179682f7a23680fad1d8c64986f2050783da1
    OwnerKey: 02e74ad2a2f21c00d9a41b1d9f3cc577a13ff991a5ec6196374f612b71a6fe0548
    VersionKey: 0dd8a916c33ad2f4f475e0754770b0115614d73fba4ec465f983cf1549825e66
    DocumentTimestamp: 2021-02-25T10:13:34.006Z

Fig. 4i

- Type: Transfer
  Content: |
    I hereby transfer possession to Alice Smith
  TechnicalDetails:
    ContentHash: b65a6961ae1eb08423057dd100fdfa2d54b0cb896cab0a7bc0052a6568f4f802
    OwnerKey: 02204c62e0706e270df86e4ca6c545d5f1188c94266b95a48024ab6e93b714bf63
    VersionKey: 86958534ec02aeb3f2b350e340f30ee3dd7922bfbe34f5b173326c1d6ed7c713
    DocumentTimestamp: 2021-02-25T10:14:46.510Z

Fig. 4j

- Type: Invalidation
  Content: |
    Invalidated, document no longer legal
  TechnicalDetails:
    ContentHash: ba580399614524929492538fbca986d180ba1ab81da9b7f6811a98c7cdc6be36
    OwnerKey: 0000000000000000000000000000000000000000000000000000000000000000
    VersionKey: 0947141f03bb99d7c3d397275b77fc1ce3dc0fd8f1faf8c5db9056c9681c0d38
    DocumentTimestamp: 2021-02-25T13:33:45.245Z

METHOD AND SYSTEM FOR REGISTERING DIGITAL DOCUMENTS

The present invention relates to a method and a system for registering digital documents, and in particular digital documents rendered using a document description language, such as a page description language. Further particularly, the present invention relates to such methods and systems for registering versioned such documents.

Increasingly, analogue information is being digitised. This pertains to many different types of information, such as visual and audio information, including images, moving images and music. One large area which is rapidly being digitised is written documents, such as literary works, notices, descriptions, agreements and so forth.

Analogue documents are traditionally authenticated using signatures, stamps, seals and similar, so as to guarantee the authenticity of the document and its contents to interested parties.

A common problem for digitally stored documents is to provide such authenticity, since digitally stored information in general may be tampered with without leaving any trace in the document as such. Digital signatures are known, but in general only serve to verify that the informational contents of a particular document are correct and signed. An improvement to such conventional document signatures has been proposed in the form of a so-called Ricardian Contract, which is a plain text (human readable) digital document which is digitally signed and which carries keys relevant to the signature as a part of the document itself.

Furthermore, various proposals have been put forward to tie specific versions of digitally stored documents to the physical world, so as to make the tampering of such document even more difficult.

Examples include SE 1350947, proposing a solution in which a digital document comprises information drawn from the physical world, while a one-way function value calculated based upon the digital document is published in a physical world channel, effectively and securely tying the digital document in a particular version or revision to a particular point in time, in a way which is verifiable for third parties at a later point in time.

There have also been attempts of tying a digital document to a verifiable external information stream, such as a blockchain, such as in the form of a coloured bitcoin, published on the public bitcoin blockchain.

SE 1750538-9 discloses a solution for providing a reliable notion of originality to a document, while at the same time solving the problem of securely determining document ownership including versioning of digital documents. This solution is largely based on text-based digital documents, such as using YAML-encoded documents.

However, there is still a need to be able to securely determine ownership of a particular versioned document in a way allowing the document itself to be more flexible in terms of content and layout. For instance, binary-encoded document formats, or documents including images and other non-textual content, are used in many cases to convey various information, across various versions. Put differently, there is a need for a more user-friendly and flexible solution, without jeopardising security.

The present invention provides such a solution, using non-plaintext but versioned documents for secure ownership control and version handling. This solution is provided in a way which may be completely distributed and trustless between collaborating parties.

Hence, the invention relates to a method for registering and updating an electronically stored and versioned alpha digital document, said registration and updating of the alpha digital document being in a digital document register arranged to register a plurality of versions of versioned digital documents by storing, for each version of such digital document, not the document in question but a public ownership key corresponding to a so private ownership key in an asymmetric cryptographic key pair; a digital document hash value calculated based on the version of the digital document in question; and a digital document signature of the version of the digital document in question, calculated using said private ownership key, or alternatively calculated using a previous private ownership key in turn corresponding to a previous public ownership key in an asymmetric cryptographic key pair, the previous public ownership key being stored in the digital document register in relation to a previous version of said digital document immediately preceding the version of the digital document in question, the method being characterised in that the method comprises the steps a) providing a first version of said alpha digital document, the alpha digital document being defined in a document description language to have a respective defined rendered graphic representation for each version of said alpha digital document; b) registering said first version in said digital document register; c) providing a second version of said alpha digital document by adding, in said document description language, a reversibly added part to said first version of the alpha digital document, said second version of said alpha digital document comprising a second set of metadata; and d) registering said second version in said digital document register, in that said second set of metadata is embedded as a part of said second version of the alpha digital document without the embedding affecting said graphic representation for the second version of the alpha digital document, in that at least a part of the reversibly added part that affects the rendered graphic representation for the second version of the alpha digital document can be unambiguously generated based on the second set of metadata, and in that the registering in step d comprises calculating and storing in the digital document register a hash of the second set of metadata.

Moreover, the invention relates to a system for registering and updating an electronically stored and versioned alpha digital document, said system comprising a digital document register and being arranged to perform said registration and updating of the alpha digital document in said digital document register, the digital document register being arranged to register a plurality of versions of versioned digital documents by storing, for each version of such digital document, not the document in question but a public ownership key corresponding to a private ownership key in an asymmetric cryptographic key pair; a digital document hash value calculated based on the version of the digital document in question; and a digital document signature of the version of the digital document in question, calculated using said private ownership key, or alternatively calculated using a previous private ownership key in turn corresponding to a previous public ownership key in an asymmetric cryptographic key pair, the previous public ownership key being stored in the digital document register in relation to a previous version of said digital document immediately preceding the version of the digital document in question, the system being characterised in that the system is arranged to a) receive a first version of said alpha digital document, the alpha digital document being defined in a document description language to have a respective defined rendered graphic representation for each version of said alpha digital document; b) register said first version in said digital document register; c) receive or produce a second version of said alpha digital document, the second version of said alpha digital document being defined by adding, in said document description language, a reversibly added part to said first version of the alpha digital document, said second version of said alpha digital document comprising a second set of metadata; and d) register said second version in said digital document register, in that said second set of metadata is embedded as a part of said second version of the alpha digital document without the embedding affecting said graphic representation for the second version of the alpha digital document, in that at least a part of the reversibly added part that affects the rendered graphic representation for the second version of the alpha digital document can be unambiguously generated based on the second set of metadata, and in that the registering in step d comprises calculating and storing in the digital document register a hash of the second set of metadata.

In the following, the invention will be described in detail, with reference to exemplifying embodiments of the invention and to the enclosed drawings, wherein:

FIG. 1 is an overview of a system according to the invention, arranged to perform a method according to the present invention;

FIGS. 2*a*-2*j* show respective graphic representations of a particular digital document in versions 1, 2, 3, 4, 5, 6, 7, 8, 9 and 10;

FIG. 3 shows the contents of a digital document register according to the present invention after registration of the respective document versions shown in FIGS. 2*a*-2*j*, where each row in the table of FIG. 3 corresponds to an amendment performed in connection to a respective one of FIGS. 2*a*-2*j*, in order;

FIGS. 4*a*-4*j* show respective alphanumeric metadata information stored as attachments in the particular digital document in question for said versions 1-10;

For reasons of brevity, FIGS. 2*b*-2*j* do not show the first two pages of the graphic representation, but it is realised that the first two pages of FIG. 2*a* are also part of each of the FIGS. 2*b*-2*j*. Similarly, FIGS. 2*e*-2*i* only show one page each, but are understood to each comprise the first two pages of FIG. 1 and in addition thereto the full page shown in FIG. 2*d*. Similarly, FIG. 2*j* only shows one page, but is understood to comprise the two first pages of FIG. 1, the full page shown in FIG. 2*d* and also the full page shown in FIG. 2*i*.

The present invention is partly based upon cryptographic keys, and in particular asymmetric cryptographic key pairs. In general, such key pairs comprise a respective private key and a respective public key. Then, a certain piece of information which has been encrypted (or signed) using one of the keys can be decrypted (or verified) using the other key. Specifically, the public key can be used to decrypt a piece of information which has been encrypted using the private key or verify a signature performed using the private key.

Such encryption is typically performed on a hashed version of the information. A hash so value is then first calculated using a one-way function, in other words a function the input value of which is, in practice, impossible to determine based only upon the corresponding function output value, and which is substantially one-to-one in the sense that in the practical applications described herein, two different input values will in practice always result in two different output values. Examples include many hash functions which are conventional as such, such as SHA hash functions, such as SHA-1, SHA-2 and SHA-3, as well as MD5.

Therefore, it is practically impossible to calculate the said verifiable encryption or signature without actually having access to the private key in question. Similarly, the public key is determined in a way which makes it, in practice, impossible to calculate the value of the corresponding private key based on the public key in question.

In case a particular private key has been used to encrypt or sign a certain piece of information, using the corresponding public key to successfully decrypt or verify the information or signature constitutes a proof that the said private key was actually used to encrypt or sign the piece of information in question.

Such asymmetric cryptography key pairs are well-known in the art as such, and will not be discussed in more detail herein.

Herein, keys are in general referred to as [public/private] [type] key, where [public/private] may be "public" or "private"; and [type] is the type of key pair considered, such as version, ownership or ledger key pair.

Figure 1:
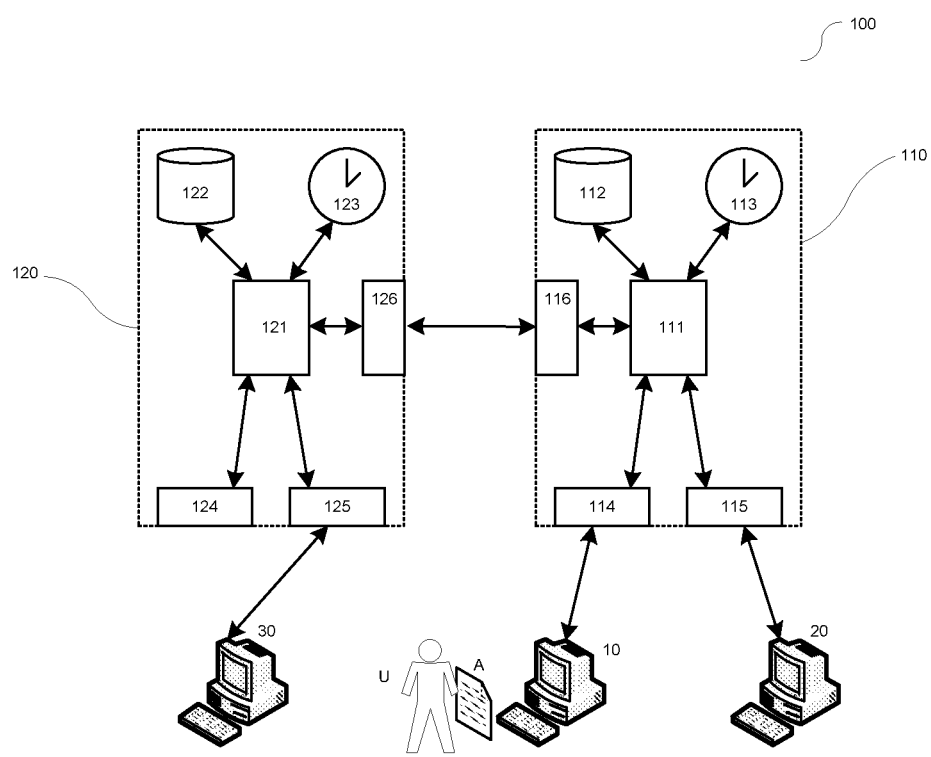

FIG. 1 illustrates a system 100 according to the present invention, which is useful for performing a method according to the invention.

The system 100 comprises at least one central server 110, in turn comprising a logic module 111, a database 112, a time unit 113, a document registration interface 114, a document verification interface 115 and a distributed register interface 116. The logic so module 111 is in digital communication with the rest of the units 112, 113, 114, 115, 116, and is in general responsible for performing the method steps described herein that are performed by the central server 110, including document and other information handling, processing and communication. Therefore, the logic unit 111 preferably comprises a computer processor (CPU), a random access memory (RAM) and communication means to communicate with the other units 112-116.

The database 112 is arranged to store the register described below, and in addition thereto any other relevant data, such as method state data and personal and account user data of users to the system 100.

The time unit 113 is arranged to provide a current time, such as from an internal clock or from an external time source, and may provide current time and/or time signal information to the logic module 111 according to the below.

The interfaces 114, 115, 116 will be described in detail below, but are in general digital, electronic interfaces, preferably application programming interfaces (API's), arranged for automatic machine-to-machine communication with system 100 components arranged externally in relation to the central server 110. Interfaces 114, 115, 116 may be separate interfaces or different aspects or functions of one and the same interface.

The notion "central server", as used herein, relates to a set of logically centralised functionality. Such functionality may be implemented as software functionality running on a standalone hardware server; be implemented as a distributed software functionality running in parallel as individual, communicating software applications on several servers; be implemented as a software functionality running on a virtual server, in turn running on one or several, distributed servers; or a combination of one or several such setups. It is also possible that part of the central server functionality is implemented in hardware logic. Hence, the term "centralised" describes a connected functionality forming one logical unit.

A second central server 120, which may be identical (such as running an identical set of software functionality, in the same or a different state) or similar to the first central server 110, may also be part of the system 100, comprising a corresponding database 122, time unit 123, document registration interface 124, document verification interface 125 and distributed register interface 126. In this case, the central servers 110, 120 are in digital, electronic communication with each other, via the respective distributed register interfaces 116; 126. There may be also more than two such interconnected central servers 110, 120.

All communications herein may take place via the open internet, or, as the case may be, within a local area network. Furthermore, all communications that are open to third parties are preferably, when so is desired due to the nature of the communicated information, encrypted. At any rate, all communications and all data management are of electronic and digital nature. Both the digital documents and the digital document register discussed herein are electronically stored, such as on hard drives or on RAM memories.

The present invention is based upon the use of a digital document register, or ledger. The ledger may be "central" in the corresponding sense as in relation to the central server (described above), meaning that the ledger is accessible as one connected entity. As such, the digital document register may be stored in one centralised location, logically or physically, or be distributed with at least one single point of access.

Alternatively, the ledger may be distributed in the sense that it is stored in several copies at different logical locations, such as one copy stored by each participant in a collection of cooperating user U peers. Even though the ledger may be kept by the first, second and/or any third and further central server, and updated in a centralised fashion, it may also be updated using a suitable consensus algorithm among such peers. Importantly, the present invention allows for a system configuration that does not rely on trust to a central party, even in case such a central party may be used, in the form of said central server, for practical reasons. In the following, the ledger is described as stored in one or several central servers. It is realised that, in case the ledger is distributed among one or several peer parties, the description provided here in terms of central servers is correspondingly applicable to such peer parties, each being associated with one respective interconnected "central server".

Hence, the digital document register is digitally and electronically stored, and comprises information at least regarding digital documents registered with the system 100 according to the invention and document transactions pertaining to such documents, such as additions to such documents; changes of ownership of such documents; and termination (invalidation) of such documents. However, the digital document register does not comprise the documents themselves, and in particular not a respective payload content of such documents. This way, the document and its payload contents can be kept locally, by the interested party or parties, and hence remain secret if so is desired. Still, the registration of the digital document in question in the digital document register of the system 100 provides security for the parties, and any interested third parties, regarding the contents of the digital document in question in its various versions, as well as regarding ownership to the digital document in question. This will be detailed in the following.

In general, the digital document register may be stored in the database 112 of the central server 110. It may also be stored in the database 122 of the other central server 120, and in general in a plurality of databases of such central servers. Each central server 110, 120 may preferably store its own full copy of one and the same digital document register, or each central server 110, 120 may store different subsets of the digital document register, which subsets may be partly overlapping. Hence, the digital document register may be distributed across several central servers 110, 120, such as across respective central servers jointly offering digital document registration services to third parties or internally among each other.

According to one preferred embodiment, digital document register data is exchanged between central servers 110, 120 via interfaces 116, 126, preferably automatically so as to implement a predetermined synchronization scheme of the digital document register so among the central servers 110, 120. For instance, each central server 110, 120 may be obliged to update its copy of the digital document register to the most recent version available on the network of central servers 110, 120, such as from peer central servers or a master central server, with a minimum time frequency, which minimum time frequency is preferably at least one time per day, preferably at least one time per hour. Alternatively, each central server 110, 120 may be obliged to update its copy of the digital document register to the most recent version available on the network in connection to each digital document register transaction involving the central server in question. The digital document register may also be defined using any suitable consensus algorithm among the participating central servers 110, 120.

Preferably, the digital document register is complete in the sense that it comprises all document transactions pertaining to the digital documents handled by the network of central servers 110, 120 sharing the same digital document register in question. Hence, by consulting the digital document register, it is possible for a part to verify any digital document registered in the digital document register, both in its current latest version and previous versions.

The digital document register may also be stored with an external information storing part, as a backup or as a main point of storage for the digital document register. It is, however, possible that at least one central server 110, 120 can guarantee the validity of the digital document register, and is a trusted party in relation to all users U of the system 100.

Such users U each use a respective general-purpose computer 10, 20, 30, such as a desktop computer, a laptop computer, a smartphone or a software function to interact with at least a respective one of the central servers 110, 120. As mentioned above, in distributed-ledger setups, each user may have their own server, interacting with corresponding servers of different users U, resulting in that there is no need for any central servers that are not directly associated with individual users U. What is said here in relation to central servers 110, 120 is hence correspondingly applicable to such decentralised ledger configurations of the system 100.

Hence, interactions of said type take part via interfaces 114, 115, 124, 125 and comprise the registering of digital documents A, additions, assignments and invalidations of such digital documents A, as well as verifications of such digital documents, including information regarding versions, ownership and status.

Users U may of course be human beings. However, it is realized that a system 100 according to the present can also handle machine users, such as automatically, electronically operated stock exchange servers, brokerage servers, insurance-managing servers, or any other entity that deal with agreements or other type of electronically stored digital documents in an automated manner. Hence, computers 10, 20, 30 may be controlled by human users U or act automatically based upon software logic implemented by the computers 10, 20, 30 themselves, possibly being triggered by externally communicated triggers such as the introduction of a particular agreement between two parties, which agreement is codified in an electronic digital document A as described herein.

Figure 5:
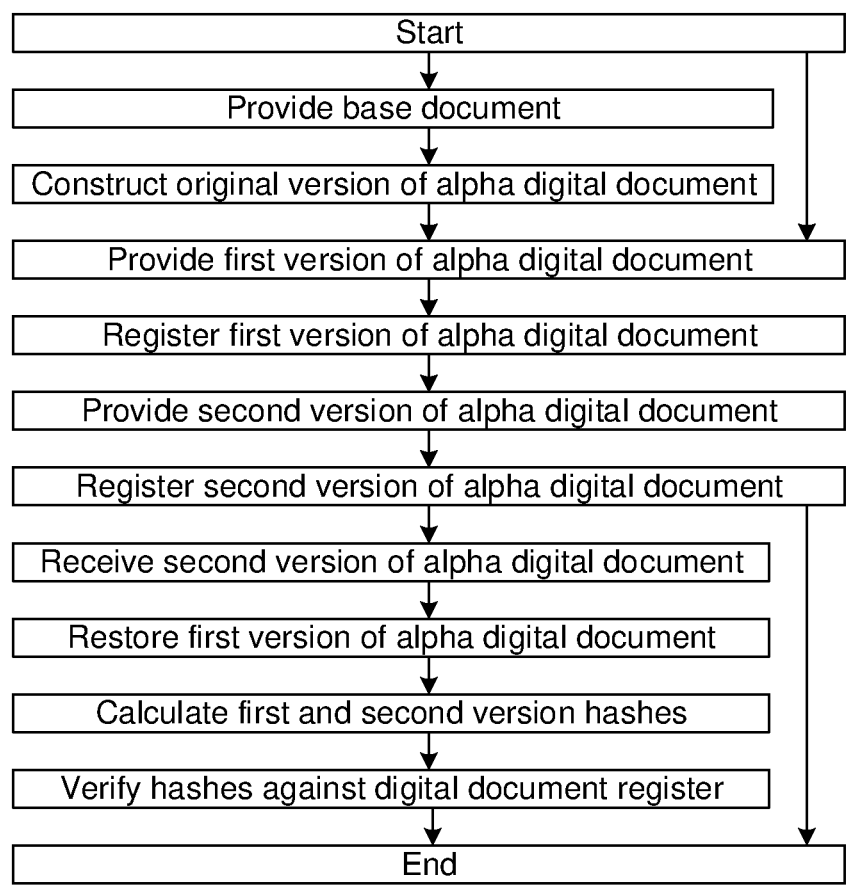
FIG. 5 is a flowchart showing a first method according to the invention.

FIG. 5 illustrates a method according to the invention, for registering an electronically stored digital document A in a digital document register of the above discussed type.

One important difference between the present solution and that described in the above-referenced document SE 1750538-9 is that the present solutions does not operate on plaintext digital documents. Instead, the digital documents referred to in the present disclosure are electronically stored, digital documents that are defined in a document description language. Alternatively, such a "document description language" may be denoted "document definition language".

There exist many examples of document description languages, such as PDF, postscript and markup languages such as LaTeX. Common to all of these description languages is that a file containing the definition of a document is in itself not a WYISWYG (What You See Is What You Get) representation of the document as it is intended to appear to an observing so human. The digital document is instead subjected to a process called rendering, wherein a renderer (typically a piece of software, such as Adobe Reader®) reads said file and produces a corresponding graphic representation of the document. This graphic representation is typically unambiguous and well-defined, and may also be platform-independent in the sense that a rendering of the file will produce identical results irrespectively of a computer platform or operating system on which the rendering software executes, as long as the defined syntax and formatting rules of the document description language are followed.

The graphic representation may be printed onto paper, or further rendered (printed) to a different document description language, to then form a different digital document encoded in that other language.

One type of document description languages is word processing formats, such as used to produce DOCX and RTF documents. Such documents can be rendered by, for instance, Microsoft Word®, by reading a DOCX file and displaying the corresponding pages on a computer screen. In this case, the DOCX file itself is coded using the DOCX file format to correspond to the graphic representation shown on the screen after rendering, but the file is not a WYSIWYG representation of the document as it is intended to be viewed by a human user (however, the on-screen representation is). In fact, the file itself may, depending on the document description language used to produce it, be completely unintelligible for a human viewing the raw alphanumeric contents of the file.

To summarise, the "digital document" in the present invention is a coded set of information, coded using a document description language. In other words, the digital document is defined using the document description language, the definition being the coded contents of the digital document in question. This digital document is then associated with a human-readable graphic representation, produced based on the digital document using a defined rendering process. The rendering process is specifically adapted for producing such graphic representations based on such defined digital documents and knowledge about the document description language in question and how to parse syntax produced according to the document description language in question.

Unlike the example of DOCX documents, the present invention uses a document description language admitting reversible additions, such as reversible appends, to documents. As used herein, an "addition" is an amendment to a digital document adding content to the digital document without removing any existing part of the digital document affecting the rendered graphic representation of the existing digital document (before the addition). So, when rendering a pre-addition version of the digital document; performing such an addition to the digital document; and rendering the post-addition version of the digital document, the entire graphic representation of the pre-addition version of the digital document is contained in the graphic representation of the post-addition version of the digital document.

Such an addition may be in the form of an append to the digital document, at the end of the digital document, and/or may result in an addition to the graphic representation of the digital document, such as in the form of an append at the end of the graphic representation.

In the terminology used herein, such an addition to an existing digital document results in a new, subsequent version of that same digital document. Hence, each digital document may exist in one or several different versions, each version (apart from the first one) being the result of an addition of said type to a previous version of the digital document in question.

Moreover, the addition operation performed on the digital document according to the present invention is a "reversible" addition. This means that it is possible to unambiguously produce an immediately preceding version of the digital document in question, based only on the contents of the digital document itself. This means that, if one for instance being presented with the fourth version of a digital document, it is possible to, unambiguously, derive each of the first, second and third versions of the digital document based only on the information in the digital document itself, and of course knowledge about the syntax and formatting of the used document description language, by stepping back one version at a time until the first version of the digital document is achieved.

A "reversible append" is a special case, as the word is used herein, of a "reversible addition", the word "append" meaning that the added information to the digital document A at least results in a corresponding graphic representation in which corresponding information is added strictly to the end of the graphic representation of the corresponding preappend digital document version, without affecting the contents of the graphic representation of this pre-append digital document.

The examples presented in FIGS. 2a-2j and 4a-4j are based on "incremental updates" in the PDF document standard (such incremental updates being defined as a part of the PDF standard), resulting in pure appends in the corresponding graphic representation. It is, however, realised that other document formats than PDF can be used with the present invention.

It is noted that the possibility to reversibly add to a document is a property of the document description language, in the sense that the document description language must support such reversible addition operations to digital documents defined by the document description language in question. For instance, current versions of JPEG and DOCX file formats do not support such reversible additions.

One example of a document description languages that does support such reversible additions, on the other hand, is PDF (Portable Document Format), see (section 7.5.6 about incremental updates).

Another example of a document description language that may be used with the present invention, in a corresponding manner as the examples provided herein in relation to PDF documents, is postscript.

Also, HTML (Hyper-Text Markup Language) may be used. In this and in other cases, the system 100 may comprise defined logic regarding the "reversible addition", for instance defining that a "reversible addition" in the sense of the present invention requires the party performing the addition to insert a piece of information between a predetermined set of tags (such as "<ReversiblyAdd> [ . . . ]</ReversiblyAdd>" or similar), such as immediately before an end tag of an existing document to be reversibly added. Then, the corresponding predetermined logic within the system 100 can remove these tags, together with any content within them, to roll back the reversibly added part.

It is noted that it is important that the document description language supports unambiguously rolling back to an immediately previous version of the digital document, in a way so that the exact contents of the previous version of the digital document—not only of the corresponding graphic representation—can be restored unambiguously.

Specifically regarding said graphic representation, the document description language may be arranged so that the graphic representation can be unambiguously produced from the document description language using a suitable document description language interpreter piece of software to achieve the graphic representation in question, based on the digital document in question. One example of such a document description language interpreter piece of software is Adobe Reader®, for PDF-encoded digital documents.

In many embodiments, the document description language is a page-oriented description language, such as PDF, whereby the rendered graphic representation is then also a page-oriented graphic representation. By "page-oriented" is meant, herein, that the graphic representation uses the concept of one or several "pages" to structure the information shown in the graphic representation, similar to how information on physical pieces of paper is structured. This admits paper printing the digital document in a way producing the same or corresponding (information-wise) results irrespectively of a printing equipment being used.

In some embodiments, the digital document A itself comprises binary coded information, such as encrypted and/or compressed data; image data; audio data; and so forth.

As will be understood from the following, the document description language preferably also supports embedding information, such as metadata, into a digital document, in a way so that the embedded information is not visible in a graphic representation of the digital document in question. For instance, such embedding may be in the form of a file attachment or embedded file, but may also be in the form of a comment section or similar in the digital document.

FIG. 2a shows a graphic representation of an exemplifying digital document A to be registered in the digital document register. The document A is in this case a standard promissory note. It is realized, however, that the digital document may carry or signify any type of information, such as any financial instrument; an agreement; an artistic work; and so forth, so long as the digital document can be coded in the document description language used by the system 100. In the examples shown herein, PDF documents are used for reasons of brevity and clarity, but it is realised that any suitable document description language of the type described above can be used.

The graphic representation of the digital document A as illustrated in FIG. 2a is shown in its entirety, and is formatted across three pages (it is page-oriented). The digital document A itself may for instance be stored as an encoded PDF file in the computer 10 of the user U registering the digital document A. In order to view or print the view shown in FIG. 2a (being the graphic representation), a rendering software of the above-discussed type is required.

As shown in FIG. 2a, the graphic representation of the digital document A comprises the following sections.

The promissory note itself. This is a graphic representation of a "base digital document", as will be explained below. In the example shown in FIG. 2a, this base digital document is also a graphic representation of an "Initial PDF" in the sense disso cussed below, reflecting the fact that the digital document was created based upon an initial PDF document in this case being a promissory note in the form of a PDF file.

Beginning on page 3 of the graphic representation, an "Initial append" or "Initial addition" part, including the text "DOCUMENT CREATED", a timestamp and an original document id, and further general information about the digital document. Hence, this general information contains a general document title and type; required signers with contact details. The "Initial append" part also comprises information regarding the "Initial PDF" (the base digital document), including a file name of the original PDF file (the original promissory note) and a hash of the original PDF.

Herein, such an "original" document is also denoted an "initial" document. In particular, an "initial digital document" refers to a first-in-order version of the digital document in question.

It is specifically noted that the digital document and graphic representation contents shown in the Figures are mere examples, and that the present invention can be embodied in practise in many different ways. Hence, various embodiments may or may not use individual features illustrated in the Figures by way of example, and also additional features that may or may not be described in the present specification.

As mentioned above, the present method is a method for registering and updating an electronically stored and versioned digital document A, the registration and updating of the digital document A in question being in a digital document register arranged to register a plurality of versions of versioned such digital documents A by storing information pertaining to each stored such version of such digital documents A.

The digital documents A in question are of the above-described type, as is the digital document register. In the following, an example of an "alpha" digital document will be provided, for reasons of clarity. It is noted that the term "alpha" is an arbitrary label to distinguish this digital document from other digital documents discussed.

As illustrated in FIG. 5, in a first step, the method starts.

Then, the method may comprise the step of providing, to a document owning party, the digital document A itself and a private ownership key. In general, the user U registering the digital document is the digital document A owner, since the party controlling the private ownership key is the digital document A owner in the terminology used herein. Note that a machine user 10, 20, 30 may be an "owner" to the digital document A, implying that a company or user controlling the machine user, or the automatic document registration process, is the ultimate owner of the digital document A. Hence, that the digital document A and the private ownership key are "provided to" to the owning party may mean that the owning party itself produces the digital document A and/or the private ownership key, or that a third party provides such information to the owning user. It is preferred that the owning user produces, in a conventional suitable way, the private/public ownership key pair, without exposing the private ownership key to any other party in the process.

Herein, the control of the private ownership key is denoted "ownership" of the digital document in question. It is realised that the term "possession" can equally well be used to describe the effect of controlling the private ownership key.

The said private ownership key is a private key in an asymmetric cryptographic key pair of the above defined type, also comprising a corresponding public ownership key. In the present system 100, the control of the private ownership key is equivalent to ownership of the corresponding registered digital document A. In case the private ownership private key is lost, so is ownership to the digital document A, in an irrevocable manner. It is noted that what is said here regarding the ownership key signifying ownership of the digital document A pertains correspondingly also to a particular current or latest digital document A version, as will become clear in the following.

In a next step, a digital document hash value is calculated based upon the digital document A in question. Preferably, the hash value is calculated as a hash of the encoded digital document A contents, such as the entire contents (the entire digital document A). For instance, if the digital document A is a PDF file, the entire PDF file is hashed.

Alternatively, it is possible to calculate the hash value based upon only a well-defined subset of the encoded digital document A. This is particularly the case when the digital document A comprises said digital document hash value for the same version of the digital document A, and/or a signature calculated based on this hash value. Then, said hash or signature may be embedded into the digital document A in a suitable manner and location, and the hash may be calculated based on contents not comprising the hash before being added to the digital document A. Depending on the document description language used, the entire digital document A preceding any such hash or signature information may be hashed. The corresponding may then be true for said signature.

The hash value itself may be calculated according to any conventional hash function, preferably a one-way function of the above identified type, such as using a SHA function. Preferably, the resulting hash value is at least 32 bytes long. Preferably, the hash value is calculated using a predetermined hash function broadly identified and defined across the system 100, such that any central server 110, 120, and preferably also any user U, with access to the digital document A in question may calculate the hash value in question. The hashing may be a double-hash, such as is conventional as such. It may also comprise additional calculations, apart from the hashing itself, such as truncation, padding or formatting.

In particular, it is preferred that the hash value is calculated at least based upon a timestamp which is comprised in the digital document A in question, such as the creation timestamp "2021-02-25T09:52:32.106Z" illustrated in FIG. 2*a*. Preferably, the timestamp is calculated in connection to the registering of the digital document A version in the digital document register, so that the hash value, which is calculated based upon the timestamp in question, will as a result depend upon the time of registration. This is in so particular preferred in case a document identity stored in the digital document register and/or in the digital document A is, or is calculated based upon, the hash value of a particular digital document A version. In this case, the central server 110 may refuse to register a digital document A or digital document A version with a document identity which is identical to that of a digital document A or version which is already stored in the digital document register in question, and the document-registering party may then as a response wait a short time, include an updated time stamp in the digital document A and then try again, using the hash which will then be different from the first attempt. In particular, this is the preferred case when the document identity is a short or truncated version of the hash value, preferably the hash value of a first (initial) digital document A version, such as the first 8 bytes or characters of the hash value.

In a next step, the owning party in question may use the private ownership key associated with the immediately preceding version of the digital document A, before the version now being registered in the digital document register (or an updated private ownership key, see below), to calculate a digital document signature of the digital document A to be registered, the calculation using the said hash value as input value. That the private ownership key is "used to calculate" the signature means that the private ownership key is a necessary prerequisite for calculating the signature in question. Preferably, the signature function used to calculate the signature in question is sufficiently well-defined and identified across the system 100 so that any central server 110, 120, and preferably also any user U, with access to the hash value, the signature in question as well as the said public ownership key, can verify that the private ownership key in question was in fact used to calculate the signature value of the hash in question. Preferably, it is possible for any part with access to the hash value and the used signature calculation function to determine the said signature value in a deterministic manner. For instance, the signature value may be calculated using an elliptic function cryptography approach.

As will be understood better from the below description, the digital document signature of the version of the digital document A in question may be calculated using a previous private ownership key in turn corresponding to a previous public ownership key in an so asymmetric cryptographic key pair, the previous public ownership key being stored in the digital document register in relation to a previous version of said digital document A immediately preceding the version of the digital document A in question. Put in a different way, for each new version of a digital document A being stored in the digital document register a signature of the current digital document version calculated based on a private ownership key the corresponding public key of which is stored in the digital document register in relation to the immediately previous version of the same digital document A.

In general, it is understood that, for each new digital document version stored, the ownership key may be changed or remain the same (see below), unless the new document version represents an ownership change. In many embodiments, any version following an immediate previous version needs to be signed by the owner of the immediate previous version, or for an initial version of a document the same owner may be required to sign as the one creating the initial version. This requirement may be verified by the central server 120, 130 before registering the new version in the digital register, and reject such registration in case the signature is not verified correctly. This signifies that a new version of a document can only be issued and properly signed off by the current owner creating or immediately preceding a new version.

Then, in a next step, at least the following digital data is stored digitally and electronically in the digital document register: the said digital document signature of the version of the digital document A in question; the public ownership key of this version; and the digital document hash value calculated based on the version of the digital document A in question.

The digital document signature of the version of the digital document A in question may preferably be calculated using the private ownership key of the owner of the immediately preceding version of the digital document A or, if the digital document A in question is the initial version of the digital document A, the digital document A creator and owner.

Preferably, the digital document register also stores an unambiguous (unique) reference so to the version of the digital document A for which the current version (now stored in the digital document register) is immediately following. For instance, this reference may be in the form of a unique combination of digital document identity and digital document version number (described below), but may be any unambiguous reference.

However, the digital document A in question is not stored in the digital document register as such. In fact, it is preferred that neither the digital document A itself, nor any information which may be used to restore the digital document A in question, is stored in the digital document register, or even communicated to the central server 110, or even to any of the central servers 110, 120.

Preferably, at least the hash value, the signature value and the public ownership key are provided from the user's U computer 10 to the central server 110 via the interface 114, offering a standardized set of communication calls or methods providing the means to provide such information according to a predetermined allowable and well-defined format.

In particular, it is preferred that a digital copy of the version of the digital document A which is registered is held locally by the registering user U, and possibly other interested parties that the user U has agreed to share the digital document A with. Hence, the digital document A itself will not be available by inspection of the digital document register.

Preferably, the central server 110 provides a data validation step before storing the digital document A information in the digital document register, and does not perform the said storing in case the data validation does not turn out in the positive. In particular, in such a data validation step, the document signature is preferably verified, using the relevant public ownership key, in the sense that the document signature for the digital document A version was actually calculated using the correct ownership public key. This may for instance take place by the document signature being verified using the relevant public ownership key, and verifying that it is a signature of the corresponding hash value. The validation step may also comprise verifying the version key, as described below, and further the validation of any other data provided by the user U.

Figure 3:
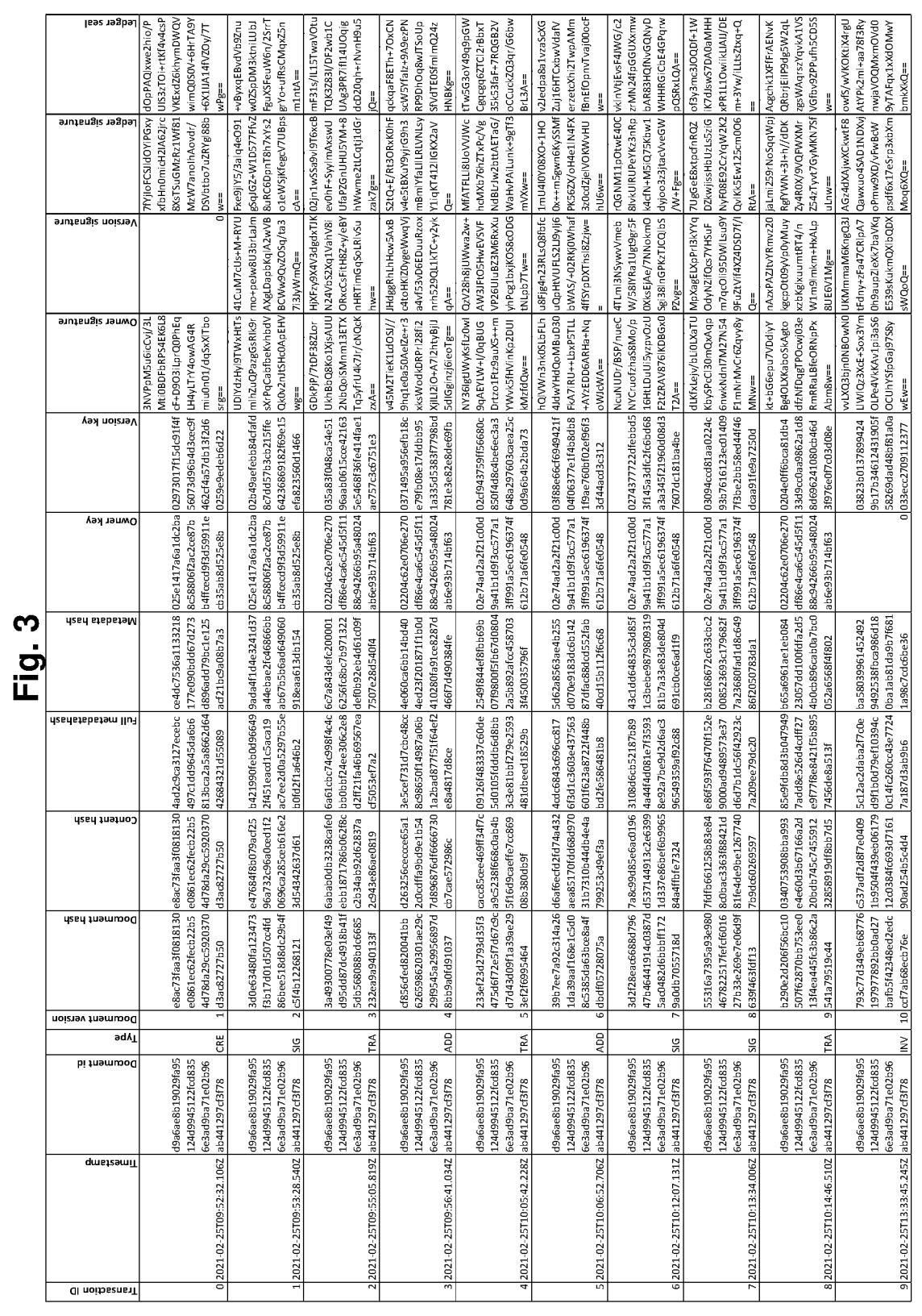

FIG. 3, first line after the headings, shows the digital document register as it is constituted immediately after the registration steps above (note that each row in the table of FIG. 3 is added after each alpha digital document A amendment described herein). The first line contains headers, the subsequent lines contain the data stored. Each line corresponds to the storing of one unique version of a digital document A. It is realised that FIG. 3 shows such lines pertaining only to the alpha digital document A used herein as an example, but that the information may comprise lines representing storing of versions of many different digital documents A, as the case may be.

Specifically, the second data line ("Trans ID"=0) corresponds to the alpha digital document A registration step, representing the first stored version of the alpha digital document A.

It is also noted that the information shown in FIG. 3 is conceptual, and that the actual data may be electronically stored in any suitable manner, such as in a conventional relational database.

According to a preferred embodiment, in addition to the above mentioned information, in the digital document register may also be stored, as a part of the said document version registration, a hash value of an initial version of the digital document A stored in the digital document register ("Document id" header). Furthermore, in the digital document register may be stored a document version number of the digital document A, to which the line pertains. The latter is illustrated in FIG. 3 ("Document version" header).

Such an initial hash value, if used, may be calculated in the corresponding way as the digital document hash (above), such that the hash value of the first stored version of a particular digital document A is identical to the initial hash value of the same digital document A version. Using such a document version and/or an initial document hash provides a simple way of keeping track of various versions of the same digital document A, which are all tied together by one and the same value for the initial hash value.

According to one preferred embodiment of the present invention, each digital document A may only be present in one single most recent version. Hence, every time an updated document version of a particular digital document A is registered in the digital document register, that version supersedes all previous versions. In other words, digital document A versions cannot preferably be forked in a tree structure. This may be supervised by the central server 110 and the document register.

Preferably, both the digital document hash value and the initial document hash value are calculated as a respective one-way function of the above described type. Further preferably, the respective version numbers of consecutive versions of one and the same digital document A constitute a monotonous series of values, such as starting from "1", that are each unique for one and the same digital document A.

In FIG. 3, the "Document id" is the hash of the initial digital document A. It is realised that both such an initial hash and a separate digital document ID (being the same for all versions of a particular digital document) can be used concurrently, if so is desired.

Hence, one and the same digital document A may be registered multiple times in the digital document register, where each such registration pertains to a particular version of the digital document A, and in particular to different successive amendments to the digital document A in question, as described below.

Preferably, in the digital document register is also stored a unique transaction identifier ("Trans ID") for each such registration of a digital document A version. That the transaction identifier is "unique" means that it is unique across all registration posts (individual lines in FIG. 3) in the digital document register. The transaction identifier may, for instance, be a monotonously growing number series, such as starting from "0".

In FIG. 3, for each line/version, the digital document hash is shown under table heading so "Document hash"; the public owner key under table heading "Owner key"; and the digital document signature under heading "Owner signature".

FIG. 3, up to the second line, illustrates the state of the digital document register after registration of a second version of the alpha digital document A, the graphic representation of which is shown in FIG. 2b. The second version of the alpha digital document A corresponds to a signature of the alpha digital document A, by Bob Smith. The graphic representation includes an image of Bob Smith's signature.

FIG. 3, up to the third line, illustrates the state of the digital document register after registration of a third version of the alpha digital document, the graphic representation of which is shown in FIG. 2c. The third version of the alpha digital document corresponds to a transfer of ownership of the alpha digital document, to Alice Smith.

FIG. 3, up to line 4, illustrates the state of the digital document register after registration of a fourth version of the alpha digital document A, the graphic representation of which is shown in FIG. 2d. The fourth version of the alpha digital document A corresponds to a text addition to the alpha digital document A, by its owner Alice Smith.

FIG. 3, up to line 5, illustrates the state of the digital document register after registration of a fifth version of the alpha digital document A, the graphic representation of which is shown in FIG. 2e. The fifth version of the alpha digital document A corresponds to another transfer of ownership of the alpha digital document A, back to Bob Smith.

FIG. 3, up to line 6, illustrates the state of the digital document register after registration of a sixth version of the alpha digital document A, the graphic representation of which is shown in FIG. 2f. The sixth version of the alpha digital document A corresponds to added agreement terms (the text "New terms to sign!" can in practise be any text describing such agreement terms). This amendment also specifies required signers for these terms to come into force.

FIG. 3, up to lines 7 and 8, respectively, illustrate the respective state of the digital document register after registration of a seventh and an eight version of the alpha digital document A, the respective graphic representation of which is shown in FIGS. 2g and 2h. The seventh and eighth versions of the alpha digital document A each corresponds to each of the required signers signing, with an image representing said signature, the sixth (or seventh) version(s) of the alpha digital document A to accept the amended terms.

FIG. 3, up to line 9, illustrates the state of the digital document register after registration of a ninth version of the alpha digital document A, the graphic representation of which is shown in FIG. 2i. The ninth version of the alpha digital document A corresponds to another transfer of ownership of the alpha digital document A, back to Alice Smith.

FIG. 3, up to line 10, illustrates the state of the digital document register after registration of a tenth version of the alpha digital document A, the graphic representation of which is shown in FIG. 2j. The tenth version of the alpha digital document A corresponds to an invalidation (termination) of the alpha digital document A, performed by its current owner Alice Smith.

Corresponding sets of metadata (see below) of these versions one-ten are illustrated in FIGS. 4a-4j.

According to the present invention, and as is illustrated in FIG. 5, the method comprises a first version provision step in which a first version of said alpha digital document A is provided, the alpha digital document A being defined in a document description language as described above to have a respective defined rendered graphic representation for each version of said alpha digital document A. That the alpha digital document A is "provided" means, as mentioned above, that the alpha digital document A is received or constructed in any of the ways described herein, or in any other way, by the owning user U in question or by the central server 110, 120, and specifically provided to the actor performing the necessary calculations necessary to add the alpha digital document A information (hash, signature, public ownership key) to be stored in the digital document register.

In a subsequent first version registration step, said first version of the alpha digital document is registered in said digital document register, as described above.

In a subsequent second version provision step, a second version of the same alpha digital document A is provided, with the corresponding meaning as for the first version provision step.

It is realised that the terms "first version" and "second version" pertain to any consecutive set of two versions of the alpha digital document A. Hence, it may be question of versions 1 and 2; 2 and 3; or any combination of versions x and x+1.

According to the invention, the provision of the second version is performed by adding, in said document description language, a reversibly added part to said first version of the alpha digital document A.

It is noted that the "alpha digital document", as described above, is a coded digital document, as opposed to its graphic representation which is illustrated in FIGS. 2a-2j. Hence, the reversibly added part is likewise a part added in the coded digital document in question.

However, as is illustrated in FIGS. 2a-2j, the reversibly added part preferably corresponds to a pure append also in the corresponding graphic visualisation (as discussed above). In other words, adding the reversibly added part to the alpha digital document A results in an updated graphic representation that comprises a graphically represented part, preferably located at the end of the graphic representation of the immediately previous digital document version, and preferably does not alter the graphic representation of said previous version in any way—the result of this is that the graphic representation of the immediately previous version (and in fact of any previous version) of the same alpha digital document A is present in the graphic representation of the new version, and is accompanied by an additional graphic representation, inserted at the end.

Hence, the difference between FIGS. 2b and 2a is that FIG. 2b comprises the appended graphic representation (the horizontal line; the text "2. SIGNATURE AMEND- MENT . . . " etc., up to the next horizontal line) corresponding to the reversibly added part added to the first version of the alpha digital document A; and correspondingly for the rest of FIGS. 2c-2j.

In general, and as described above in relation to the description of the document description language above, a reversible addition of the first version of the alpha digital document A may result in a corresponding change in the graphic representation of the alpha digital document A, said change being a pure append at an end of the graphic representation as compared to a graphic representation of said first version of the alpha digital document A.

Further according to the present invention, the second version of said alpha digital document A comprises a second set of metadata. It is noted that the second set of metadata is added to the alpha digital document A as a part of the creation of the alpha digital document A in said second version, and that the second set of metadata was not present in the alpha digital document A in said first version.

As used here, the term "metadata" denotes any set of suitably formatted and stored information, but having the particular properties described hereinbelow.

According to the present invention, said second set of metadata is embedded as a part of said second version of the alpha digital document A without the embedding as such affecting the graphic representation corresponding to the second version of the alpha digital document A. In other words, when embedding the second set of metadata into a digital document A encoded using said document description language, the corresponding graphic representation of the digital document A in question is not affected. For instance, the metadata may be added to the alpha digital document A as a file attachment, not being used to render the graphic representation.

In a subsequent second version registration step, said second version of the alpha digital document A is registered in the digital document register.

In a subsequent step, the method may end.

Further according to the present invention, at least a part of said reversibly added part that affects the rendered graphic representation for the second version of the alpha digital document A can be unambiguously generated based on the second set of metadata.

FIGS. 4a-4j illustrate corresponding metadata contents added as a respective part of the reversibly added part in corresponding versions of alpha digital document A. As an example, in FIG. 4c a set of metadata comprised in the reversibly added document part added to the alpha digital document A for producing the third version is shown.

As seen in FIG. 4c, the metadata contains various information formatted according to a particular defined syntax, defining an amendment "Type" as a "Transfer", with a "Content" being specified as the text "I hereby transfer possession of this original to Alice Smith." It is noted that the word "original" is used here, meaning "current verifiably valid version". There is also a time stamp in the metadata. For instance, the syntax may be a tab-stop text file, XML, YAML, a binary file with a particular well-defined data storage syntax, or any other well-defined data syntax.

Looking at FIG. 2c, the corresponding information is stated in the graphic representation. Hence, the metadata can be used, by a piece of software with knowledge of said particular defined syntax and the ability to parse said syntax, to generate the graphic representation shown at the bottom of FIG. 2c.

Preferably, the metadata can be used, by a piece of software with knowledge of said so particular defined syntax and the ability to parse said syntax, to generate the reversibly added part of the digital document A (apart from the embedded metadata itself, which does not affect the graphic representation anyway), resulting in the graphic representation in question when the generated reversibly added part is rendered. It is understood that the piece of software may then use a particular defined formatting of the reversibly added part, in terms of fonts layout, any added graphical element (such as the horizontal lines shown in FIGS. 2a-2j, etc.), in order to produce a consistent and aesthetically pleasing appearance of the resulting graphic representation. The generation of the reversibly added part is preferably unambiguously defined based on the metadata in question, the document description language and a defined (such as by the system 100) set of formatting rules used by the piece of software in question.

The reversibly amended part may even be created this way, namely by providing said second piece of metadata to such a piece of software (for instance, executing on the central server 110, 120); and said piece of software producing said reversibly added part in the way described above. Then, the produced part may be reversibly added to the first version of the alpha digital document A, and the second metadata also being embedded into the alpha digital document A, in order to hence produce the second version of the alpha digital document A automatically based on the provided set of metadata.

To this end, it is noted that the metadata may contain binary information, such as an electronic signature and/or an image of a pen-and-paper signature (such as shown in FIG. 2b, bottom, the signature of Bob Smith).

Preferably, the second set of metadata contains at least the information constituting a payload information of the amendment to the alpha digital document A defining the significance of the amendment in question. For instance, in the transfer of the document to Alice Smith shown in FIG. 2c, the corresponding metadata comprises information signifying that it is question of a transfer to Alice Smith, such as the text "I hereby transfer possession of this original to Alice Smith.". It is also preferred that the timestamp shown in the graphic representation of the addition is comprised in the metadata.

Further according to the present invention, the registering in the second version registration step comprises calculating and storing in the digital document register a hash of the second set of metadata. In FIG. 3, for each line this hash is shown under header "Metadata hash".

A subsequent (such as a third) version of the alpha digital document A is then constructed and registered in a corresponding manner, using another reversibly added part comprising a third set of metadata, added to the second version of the alpha digital document A; a hash is calculated of the third version of the alpha digital document A; the hash is signed, using a current or immediately preceding-version private ownership key; and then the hash, the resulting signature, a current public ownership key and a hash of the third set of metadata are stored in a new entry in the digital document register.

This way, a potentially indefinite number of additional versions of the alpha digital document A can be created and registered in the digital document register, one after the other. The same digital document register may concurrently be used to store versions of other digital documents, using one line in FIG. 3 for storing one such version.

Such a method and such a system 100 achieves that the alpha digital document A in all its various versions, and any additionally stored digital document(s) in its/their one or several version(s), can be securely verified by any user U to the system 100, without the digital documents A as such needing to be distributed or disclosed to other parties than the owning party and any other interested parties to which the owning party, or any other party, has granted such access. How such verification may be performed will be described below.

As a matter of fact, as will be understood from the following, the "ownership" of such a registered digital document A, in its currently updated version, may be defined as the control of the ownership private key, and possibly also control of the latest stored version of the document. Any digitally stored version of the digital document A itself may be considered as a verifiable "copy" of a version of an "original" digital document, the "original" digital document merely being defined as the latest version of the digital document A in question which is owned by the part controlling the corresponding ownership private key. It is noted that the meaning or "original" here is not the same as the below-discussed initial version of the digital document A in the sense of an originally (first-in-order) appearing such version.

Moreover, using the present method this advantage can be achieved also for digital documents A coded using a document description language of the above-discussed type. This means that the non-plaintext digital document A can be rendered, using a suitable piece of software, to a graphic representation that can be more user-friendly and aesthetically appealing to a human user, while still being just as secure in terms of ownership as a plaintext digital document of the type stored according to the solution of the above-referenced document SE 1350947.

Namely, since a next version of the digital document A is constructed using a reversible addition, it is always possible to backtrack to a previous version of the digital document A by simply reversing the latest addition. The metadata of a latest version can be used to render the version of the graphic representation representing the latest amendment, and can be verified against the digital document register entry of the metadata hash for that version in question. Hence, such verification is to the point that the reversibly added digital document A as it is viewed in the graphic representation is actually accurate. By performing said reversing of the reversible addition, it is possible to verify, against the digital document register, the corresponding information in relation to the immediately preceding version of the digital document A, and so forth all the way back to an initial version of the digital document A in question.

Such verification, and chain of verifications, can be performed without any other information than the digital document A itself and access to the digital document register, since the latest version of the digital document A itself contains all the sets of metadata for all the versions, from an initial version up to the latest version.

In some embodiments, the second version registering step further comprises calculating and storing in the digital document register a hash of the reversibly added part itself (i.e. the document description language-encoded added matter). The hash may be calculated in the general way described above, and is shown in FIG. 3 under heading "Content hash".

In some embodiments, the second set of metadata comprises a hash or signature (that may be calculated in the general way discussed above) of a part of the reversibly added part. In order to avoid hashing loops, the part of the reversibly added part in question should not be a part containing the second set of metadata itself. In one particular example, said part of the reversibly added part comprises an additional digital document A being incorporated into the alpha digital document A in the form of an attachment, the attachment then not comprising the second set of metadata. Adding such an attachment, together with the second set of metadata, may be an efficient way of performing a reversible addition to the alpha digital document A for some document description languages. For a subsequent version, in this case, another additional digital document may be added to the alpha digital document A, together with a third set of metadata; or said other additional digital document may even be added as an attachment inside the additional digital document added to the alpha digital document A to form the previous version, resulting in a recursive chain of digital document attachments defining consecutive amendments to the alpha digital document A.

However, it is preferred that the reversibly added part is added in the form of data formatted according to the document description language, not as an attachment to the previous version of the alpha digital document A but as an addition to the previous version of the alpha digital document A itself, such as at the same logical layer (bracket/indentation layer, for instance) as an already-existing set of data defining the previous version of the alpha digital document A.

In a way corresponding to the case for the second set of metadata, being embedded in the second version of the alpha digital document A, the first version of the alpha digital document A may also comprise a first set of metadata, embedded as a part of said first version of the alpha digital document A without the embedding affecting said rendered graphic representation for said first version of the alpha digital document A.

One example where this is the case is when the above-discussed first version is in fact an initial version of the alpha digital document A (not the "original" document discussed above). Then, the method may comprise an initial step in which a base digital document is provided (as mentioned above in connection to FIG. 2*a*). The base digital document is preferably defined using the same document description language as said first and second versions of the alpha digital document A. The base digital document further preferably comprises binary coded data.

Then, the first version of the alpha digital document A is constructed by adding said first set of metadata to said base digital document. In addition to the first set of metadata, a reversibly added part, of the above-described general type, may also be added to the base digital document.

The first set of metadata may then comprise general information about the alpha digital document A defined this way in its first version. Correspondingly, a graphic representation corresponding to said reversibly added part may comprise the same general information, but in a user-friendly, formatted way.

An example of this is presented in the combination of FIGS. 2*a*, 3 and 4*a*.

The first set of metadata shown in FIG. 4*a* comprises initially some descriptive text explaining how the alpha digital document works, followed by a set of reference definitions regarding version of the system 100 software and formats used to produce the alpha digital document A. Then, a set of information "Content" follows, being reflected in the graphic representation shown in FIG. 2*a*. It is noted that all this information will form a part of the alpha digital document A, the metadata being embedded therein.

As is also illustrated in FIG. 4*a*, the first set of metadata may in general, for said initial version, comprise information identifying the base digital document, such as a file identifier (such as the path or file name, as shown in FIG. 4a, "Initial PDF") and/or a hash of the base digital document (as also shown in FIG. 4a). As seen in FIG. 2a, this base digital file information may also be added correspondingly in the reversible addition and the graphic representation.

It is noted that the first set of metadata also comprises (and may in general comprise one or several of) the following additional information:

LedgerURL: An address to the digital document register, such as an address to a publicly available web-application hosting a system like 110 where the digital document register used for registering this document can be viewed, verified and reversibly added/appended by an owner.

ContentHash: The above-described hash of the reversibly added part used to define the first version of the alpha digital document A.

OwnerKey: The public owner key the corresponding private ownership key of which is used to define ownership of the first version of the alpha digital document A.

VersionKey: Will be explained below.

TraceOriginalId: The above-discussed Document Id.

DocumentTimestamp: The time at which the first version of the alpha digital document A was defined, corresponding to the time stamp shown in FIG. 2a.

The base digital document may, in turn, be produced by the system 100 based on a piece of source information, such as a different type of digital document. Hence, the method may further comprise generating the base digital document based on said source information, by encoding the source information using said document description language to form said base digital document. In the present example, the two pages shown at the top of FIG. 2a may have initially been drafted using any suitable word processor, forming a piece of source information of said type in the form of a Microsoft Word® document or similar. Then, the system 100 may be arranged to receive this digital document and encode it, using the document description language, to define the base digital document. Then, the base digital document corresponds to the source information in the sense that a human viewing the source information, or a rendition of the source information into a corresponding graphic representation, will see the corresponding informational contents as the graphic representation of said base digital document.

For instance, the encoding may be performed by a piece of software identifying itself to an operating system as a "printer", resembling the basic functionality of per se conventional "print-to-PDF" printer software.

The encoding of the source information, the adding of the reversibly added part and the embedding of the first set of metadata may be performed by the system 100, for instance all as a part of such a "printing" processing, resulting in the initial version of the alpha digital document A.

The registration of each version of the alpha digital document A may also comprise calculating, and storing in the digital document register, a hash of the combination of one, several or all sets of metadata for previous versions of the alpha digital document A. In FIG. 3, this information is shown under header "Full metadata hash". The hash may be calculated as generally described above.

As mentioned above, the second set of metadata may comprise a hash of the first set of metadata (where the first version here may or may not be said initial version). The second set of metadata may also comprise a hash of the first version (such as the initial version) of the alpha digital document A. As before, these hashes may be of the above-discussed general type.

As is illustrated by way of example in FIGS. 4a-4j, said first and/or second metadata may be provided as plaintext data. Then, the metadata in question may be added to the alpha digital document A in the above manner, as plaintext data, meaning that if the alpha digital document is viewed as alphanumeric text the metadata is visible and readable as a part thereof. Alternatively, the metadata in question may be added to the alpha digital document A in a processed form, such as in an encrypted and/or compressed form.

It is realised that the metadata, even if defined in a plaintext format such as YML, may still incorporate binary-coded data parts, such as a binary coded digital JPG image.

As is further illustrated in FIG. 5, the method may comprise a verification of the second version of the alpha digital document A.

Hence, the method may furthermore comprise a subsequent step (taken before the method ends), of the system 100, such as the central server 110, 120 receiving the second version of the alpha digital document A to be verified. Then, the system 100, such as the central server 110, 120, may take the following steps.

In a subsequent step, the first version of the alpha digital document A may be restored, based on the second version of the alpha digital document A, by reversing the addition of said reversibly added part.

In a subsequent verification step, a hash of the first version of the alpha digital document A and a hash of the second version of the alpha digital document A may be calculated.

In a subsequent verification step, both of said calculated hashes may be verified against the corresponding hashes stored in the digital document register for the first and second versions of the alpha digital document A.

Furthermore, the document signature stored in the digital register may also be verified against the corresponding ownership key for the first and/or second version. Hence, for each version it may be verified that the document signature was produced using the correct private ownership key, such as the private ownership key registered for an immediately preceding version.

In a corresponding manner, for each of a set of versions of the digital document A, a respective content hash and/or a respective metadata hash and/or complete metadata hash, calculated for any reversible addition for any previous version(s) using rollbacks of the digital document A in question, and the version in question may be verified to the corresponding "Content hash", "Metadata hash" and "Full metadata hash" in the digital document register.

In other words, said calculation step may comprise also calculating a hash of the second set of metadata and a hash of any first set of metadata, and the verification step may comprise verifying also these hashes against the corresponding hashes stored in the digital document register.

In response to a digital document verification request, the system 100 may respond with information regarding the success of the verification (such as "verified"/"not verified")
.

Preferably, in the digital document register is also stored a unique transaction identifier ("Trans ID" in FIG. 3) for each such registration of a digital document or a document-related event. That the transaction identifier is "unique" means that it is unique across all registration posts (individual lines in FIG. 3) in the digital document register. Preferably, the transaction identifier is a monotonously growing number series, such as starting from "0".

According to an additional embodiment, illustrated in FIGS. 2a-2j and in FIG. 3, for the alpha digital document A stored in the digital document register, in addition to the information mentioned above, in the digital document register is also stored a public version key ("Version key"), which public version key is a public key in an asymmetric cryptographic key pair also comprising a corresponding private version key. The version key pair is not the same as the ownership key pair, but is preferably also controlled, and preferably produced, by the user registering the version in question of the alpha digital document A with the digital document register. The private version key may be produced, in a conventional manner, after which the corresponding public version key is calculated based upon the private version key. The private version key is preferably comprised in the metadata added to the current version of the alpha digital document A registered in the digital document register, when defining said version. In FIG. 4a, for instance, the field "VersionKey" precedes the private version key; in FIG. 3, first line, the field "Version key" is the corresponding public version key.

As described above, the second version of the alpha digital document A may comprise an amendment of the information carried by the alpha digital document A, such as any contractual terms specified between two parties bound by the alpha digital document A in case it is an agreement.

In general, the amendment may be any change of part of the payload arranged to convey cognitively qualitative information between parties interested in the alpha digital document A, such as parties to an agreement manifested in the document in question, or similar. For instance, the amendment may be overriding information changing the debt amount from 10000 SEK to 5000 SEK. In fact, the amendment could be any change in the cognitive contents of the first version's payload, or any addition of said payload. Preferably, such an amendment is simply indicated by a plaintext part in the graphic representation of the reversibly added part, such as the text "—Text: 5000 SEK", which is presumed legible by the parties to the debt in question.

Since the respective metadata embedded into all previous versions of the alpha digital document A are comprised in, and recoverable from, the latest version of the alpha digital document A, all ownership and version keys comprised in any previous version of the alpha digital document A will preferably also be comprised in a current latest version of the alpha digital document A.

It is further noted that the amendment in version 2 of the alpha digital document A does not entail a change in the public ownership key, since the owner of the alpha digital document A has not changed as a result of this amendment (the amendment in question is a "signature" amendment, of type "SIG" for "Signature"). Therefore, the metadata shown in FIG. 4b does not comprise an updated ownership public key. However, in one embodiment not illustrated in the Figures, the registering of each new alpha digital document A version comprises the determination (calculation) of an updated ownership private-public key pair, and the addition of an updated public ownership key to the metadata of the digital document version in question.

However, the second version of the alpha digital document A preferably comprises such an updated ownership private key, which is preferably recalculated for each new alpha digital document A version. Line 3 in FIG. 3 comprises a correspondingly updated, public ownership key, since the amendment 3 entails a transfer of the ownership to the alpha digital document A from the current owner Bob Smith to a new owner Alice Smith (see FIG. 3, line 3, where "Trans type" "TRA" stands for "Transfer").

The second version of the alpha digital document A may also comprise, at least in its embedded metadata, a current timestamp (of the definition of the second version alpha digital document A), and/or an updated document signature.

As explained above, the signature may be calculated based upon the ownership private key of the immediately preceding version of the same alpha digital document A, and based upon an updated hash value of the version being registered in the digital document register. This ensures that it is the proper owner of the alpha digital document A that produces the signature, namely the person holding the ownership private key of the version immediately preceding the version now being registered. In the special case of an initial version of the document (document creation), there is no previous version from which the owner key can be taken. Then, the owner key pair used to produce the document signature may be from the same initial version registration as for the document signature.

In other words, the first version of the digital document A may be an initial version of the digital document A, and the digital document signature may then be calculated using the same private ownership key that is stored in the digital document register in relation to the first version of the digital document A.

In FIG. 3, line 3, a third post (line) is shown, corresponding to the registration of the third version of the alpha digital document A. The transaction ID for the second version registered is 1, whereas the transaction ID for the third version is 2. The time stamp is updated to reflect the time stamp which is part of the added metadata of the alpha digital document A, which is also the case for the first and second versions. Whereas the transaction type for the first registered version is "CRE" for "create", the transaction type for the second registered version is "SIG", the transaction type for the third registered version "TRA" is for "Transfer", and for the fourth registered version it is "APP", for "Append". The document version is "4" for the fourth version, "3" for the third version, "2" for the second version, and "1" for the first version.

As is also clear from FIG. 3, third line, the content hash is different between the second and third versions, as well as the document signature ("Owner signature").

Since the ownership public key has not changed in the alpha digital document A between versions 1 and 2, the corresponding information in the digital document register (which may be the same as in the alpha digital document A) has not changed either. To the contrary, the version public key has changed between versions 1 and 2, which is reflected in the "Version key" field in the digital document register. It is noted that the version public key is not part of the alpha digital document A; instead, the alpha digital document A in any version only comprises the version private key in question ("Version key" in FIGS. 4a-4j).

In FIG. 3, a respective "Ledger seal" value is also displayed, one for each version of the alpha digital document A. The ledger seal is a seal hash which is preferably a hash value calculated based upon the digital document register itself, preferably either the immediately previously registered post or transaction in the digital document register (irrespectively of which digital document A that post or transaction related to) or the entire digital document register in its state immediately before the addition of the register transaction or post comprising the seal hash in question. The seal hash may be calculated based upon any suitable one-way function, such as SHA-256.

According to one embodiment of the present invention, the method furthermore comprises a verification step, in which the owning party, in other words the computer 10 of the user U registering the alpha digital document A version in question via the interface 114) is requested, by the central server 110, to produce a version signature of a piece of verification information using the private version key comprised in a previous version of the same alpha digital document A in question, such as the immediately preceding version in relation to a now current, latest version.

The piece of verification information may be any information which is possible to produce a signature of (one embodiment being the document hash of the new document version), using the private version key, and the authenticity of which may be verified by the central server 110, 120 using the corresponding public version key stored in the digital document register for the immediately previous version of the alpha digital document A. For instance, the piece of verification information may be a predetermined standard information which is used for this verification step; the alpha digital document A itself in its most updated or previous version; or any other well-defined piece of information.

The previous version of the alpha digital document in which the version private key is comprised is preferably the preceding version of the alpha digital document A which directly precedes the version being verified.

Preferably, the registering of an amended version of a particular digital document A comprises one or several of the following steps, and may form part of said first version registration step and/or second version registration step (discussed above):

Firstly, the digital document A owner creates a new version public/private keypair, as well as an amended version of the digital document A (comprising providing the reversibly added part including the metadata in question), with the newly created version private key inserted in said metadata.

Secondly, the digital document A owner creates a digital document register API call containing the newly created version public key, as well as a signature of the said version public key using the previous version private key, which version private key is read from the previous version of the digital document A held by the digital document A owner.

Thirdly, the digital document register verifies the said signature, as well as the digital document A owner signature, and may store them both in the digital document register, along with the new version public key received from the digital document A owner.

The storing in the digital document register described above is preferably not performed unless a public version key stored in the digital document register with respect to said previous version of the digital document A in question matches the version signature in question, in the sense that the central server 110, 120 is able to verify, using the said version public key, that the version signature in question was actually calculated using the version private key. This may imply that the central server 110, 120 decrypts the version signature, using the public version key, and that it compares the result with the predetermined information expected.

Hence, in order to store a new most recent version of the alpha digital document A, the storing user must have access to a copy of the said previous version of the alpha digital document A, since the version private key is only stored therein. Hence, it is not possible for a non-authorized user to hijack the alpha digital document A by registering a new version of it with the digital document register. Also, if the alpha digital document A itself is lost, it is not possible to restore the alpha digital document A by registering an additional version of the same alpha digital document A. Preferably, in this case the only amendment allowed by the central server 110, 120 is a revocation of the alpha digital document A. Further, digital document A version forking, which is undesired, will be more unlikely.

Figure 6:
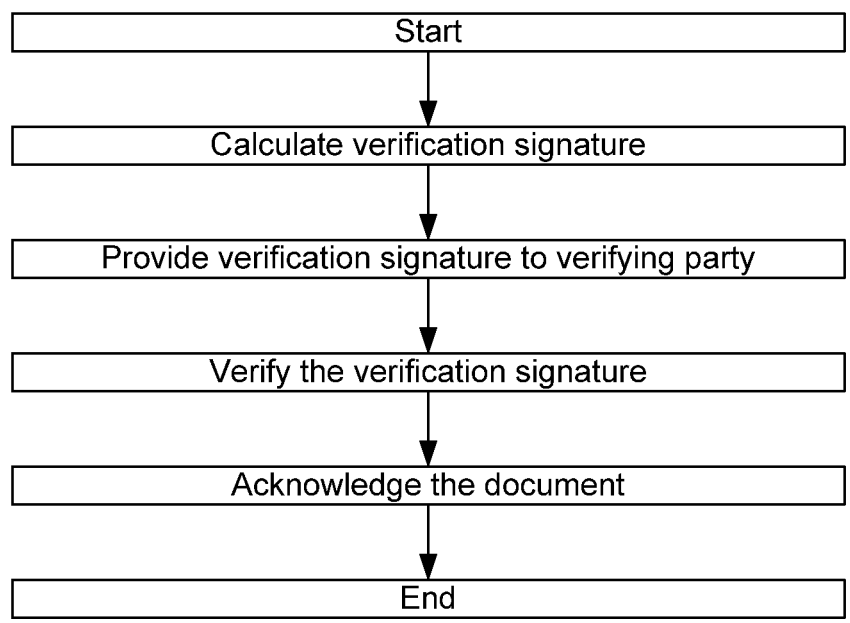
FIG. 6 is a flowchart showing a second method according to the invention.

Once a particular version of the alpha digital document A has been registered in the digital document register, it may be verified by any interested party as being authentic, and it may be verified that a party claiming to be the owner of the current version of the alpha digital document A is in fact the rightful owner. A verification method, which may constitute a part of the registration method described in connection to FIG. 5, such as a part of the document verification steps shown in FIG. 5, is illustrated in FIG. 6, and starts in a first step.

In a second step, the owning party in question may use the private ownership key of a latest version of the alpha digital document A (that is, the private ownership key corresponding to the public ownership key which is stored in the digital document register and which may be specified in the alpha digital document A itself for said latest version), to calculate a digital verification signature of a piece of digital verifying information. This verifying information may be any predetermined piece of information, such as the text "I, Mr. Bob Smith, own this document, with Doc Id *97cf3f78 at the time 2021-02-25 10:12:00"; the alpha digital document A itself; or any other suitable well-defined piece of information. It is preferred that the predetermined piece of information comprises a subpiece ("Mr. Bob Smith") which is specific to the owner. It is furthermore preferred that the predetermined piece of information comprises a subpiece ("Doc Id *97cf3f78") which is specific to the alpha digital document A in question, such as for the digital document A itself in general, or for the digital document A specifically in its latest version. It is also preferred that the predetermined piece of information comprises a subpiece specifying the current time at the request in question ("2021-02-25 10:12:00"). This avoids replay attacks.

Then, in a next step, the owning party may provide, to a verifying party, the verification signature calculated. The verifying party may be any interested party requesting the verification of the ownership of the version in question of the alpha digital document A. Such a request may be posed via the interface 115, and may be conveyed between the verifying user and the owning user via the central server 110, 120. However, preferably the verifying party and the owning party may perform these verification steps directly between them, preferably using a predetermined communication interface between the computers 10, 20, exchanging the information required to perform the ownership verification.

In a subsequent step, the public ownership key in question may be used to verify both the verification signature and the document signature. Hence, the verification signature may be verified in the sense that it is verified, using the public ownership key stored in the digital document register and possibly in the alpha digital document A as such, that the private ownership key was in fact used to calculate the verification signature. For instance, the public ownership key may be used to decrypt the verification signature, and the result may be compared to the expected piece of information. The document signature may also be verified, using the same ownership public key, in the sense that the document signature stored in the digital document register was actually calculated using the correct ownership public key (as described above) in the corresponding manner.

As long as the verifying party has access to the version in question of the alpha digital document A, both parties have all necessary information to perform these verification steps. If the verifying user does not actually have access to the alpha digital document A, the verifying party may request the ownership public key and the document signature from the central server 110, via interface 115. It may also be so that the central server 110 provides, via interface 115, a service to third parties to verify ownership and authenticity of a particular digital document A identified by the third party in question, by sending the corresponding request for a verification signature to the owning party indicated by the third party in question. The digital document A may be identified using the stored Document ID in the digital document register.

In a subsequent step, in case the verifications described above turn out in the positive, the version in question of the alpha digital document A is acknowledged, meaning that the party claiming to be the owner is in fact the owner, and that said version is authentic.

This verification may also comprise verifying that the version for which verification is requested is actually the latest version for the alpha digital document A.

Hence, using such a verification method, the ownership and authenticity of a particular version, such as the current latest version, of a digital document A may be securely verified without having to actually communicate the actual digital document A, its contents or its graphic representation between the parties, or even between any party and the central server 110. As long as the party claiming to be the owner controls the appropriate private ownership key, such party is in fact the proper owner.

In particular, it is preferred that the digital document register does not comprise any information regarding the identity of the owning party. Then, the verification procedure preferably comprises an initial step in which the verifying party electronically queries the owning party regarding ownership status of the version in question of the digital document A.

It may be so that the verifying party wishes to verify also that the party claiming to be the owner to a particular version of a digital document A actually has access to a copy of the version in question of the digital document A, for instance as an extra security measure. Then, the verification method may comprise an additional, separate step, in which it is verified that the owning party has access to the version in question by calculating a verification hash value based upon the digital document A in that version, and the verifying party verifying the verification hash value which is sent electronically and digitally from the owning party to the verifying party. The hash value in question may be calculated using a predetermined hash function which is known by both the verifying and the owning party, but the hash value is preferably not the same as the corresponding document signature stored in the digital document register.

It is understood that the digital document register may store registration posts for several different digital documents A simultaneously, in which case the posts or lines appear in the digital document register in order of registration time, irrespective of to which digital document A a particular digital document A version pertains.

The digital document identifier ("Document Id") illustrated in FIG. 3, and which is preferably stored in the digital document register for each registered digital document A version, is preferably at the most 16 bytes of length (even if this is not the case in FIG. 3), and is preferably used to identify the alpha digital document A by and to interested parties, and in particular by and to the owning party in question and the central server 110. Preferably, it is this digital document identifier which is used to identify a particular digital document or digital document version when communicating over the interfaces 114, 115.

According to one preferred embodiment, the interface 115 is arranged to expose publicly all fields of the public digital document register. Also, at least one of the central servers 110, 120 may be arranged to publish the updated digital document register in a public manner, such as on a publicly available web site, for document verification by interested third parties.

As mentioned above, the method according to the present invention may furthermore comprise the additional steps of amending the alpha digital document A, and thereafter performing the calculation of the digital document hash value based upon the alpha digital document A and the calculation of the digital document signature of the alpha digital document A, as described above, using the amended document (the defined new version of the alpha digital document A, such as said second version). Hence, in this case, the "amended document" constitutes a new, subsequent, version of the alpha digital document A, registered as an additional post or line in the digital document register, with a new, unique, version number ("Document version") but with the same document identifier ("Document id") as for the previous version. As a result of said steps, a digital amended document hash value is produced, as well as a digital amended document signature, and so the amended document signature as well as the public ownership key and the amended document hash value are digitally stored in the digital document register, as an additional digital document A version, while the amended digital document A as such is not stored in the digital document register.

This is, for instance, illustrated in FIG. 2d, illustrating such an amended digital document A (adding particular agreement terms), and in FIG. 3, up to the fourth line, showing the state of the digital document register after such amendment.

In particular, it is preferred that the alpha digital document A to which the amendment in question pertains is associated with all previous versions of the alpha digital document A in the digital document register, and that the information stored for the alpha digital document A and all previous versions of the alpha digital document A are retained in the digital document register when storing an additional version of the alpha digital document A. In the Figures, the association is embodied using the field "Document ID".

In fact, FIGS. 2c/4c, 2e/4e, 2i/4i and 3 illustrate, in the corresponding way, another type of amendment to the alpha digital document A, of the type "TRA" for "transfer", or assignment, of the alpha digital document A to a different owning party. Furthermore, FIGS. 2d/4d, 2f/4f and 3 also illustrate, correspondingly, an additional amendment, of the type "APP", which is performed by the said different owning party (the new digital document A owner), while FIGS. 2j, 3 (line 10) and 4j illustrate yet another additional amendment, this time of the type "INV" for "invalidation" or cancellation of the document in question.

In general, it is preferred that, for each version (amendment) of the alpha digital document A, a respective time stamp is additionally stored in the digital document register, preferably being identical to a corresponding time stamp comprised in the amended alpha digital document A itself, at least for addition and ownership-change type amendments. In some cases, the time stamp stored in the digital document register may, however, be different from that stored in the digital document itself. This latter alternative avoids the so user U having to wait for a response from a remotely stored digital document register before finalising the digital document version, making the registration process more efficient. A subsequent verification of the version in question may then, for instance, comprise a step in which it is verified that the two time stamps (document and register) are not further apart than a predetermined time period.

In particular, it is preferred that the time stamp in question comprises or is calculated based upon a time stamping signal value calculated based upon a publicly available information source and using a one-way function of the above defined type. Herein, a "publicly available information source" means a certain well-defined source of information which can be sampled, described or used as-is in order to produce a reference document describing a current state of the reference source. Examples of reference sources include the current quotes for certain predefined exchange-traded stock; the current standing in a sports game; the currently viewed image frame in a publicly broadcast live television program or a currently broadcast audio signal in such program or a publicly broadcast live radio program; and the current front page of a newspaper published on the internet. It is then such a sampled reference document which is used to calculate the time stamping signal in question. The calculation of such a time stamping signal is described, for instance, in SE 1350947. Using such a time stamp makes it possible for verifying parties to verify that the digital document A in question could impossibly have existed before a certain point in time at which a particular piece of information used to calculate the time stamping signal value in question appeared in said information source.

It is also preferred that the method further comprises a step, which is repeated for each registration of an additional alpha digital document A version, in which a digital register signature is calculated based upon the digital document register as such, and wherein this register signature is publicly published. The above described seal hash, in case it is calculated based upon the digital document register as such, is an example of such a register signature. That the signature is "publicly published" means that the signature is published in a digital publication channel in such a way so that it is readily available to a wide enough audience, and with sufficient persistence over time, so that a third party is likely to be able so to verify the time of publication and the contents of the signature value exactly as it was at the date and time of publication, even if some time, such as several years, has passed after the publication. This makes it possible to verify, for any interested party, that the state of the digital document register at the time of calculation of the register signature at least existed at the time of publication of said register signature. Hence, using the time stamping signal as described above in combination with the public publication of the register signature, any party can verify, with high accuracy, the timing of a particular registered version of the alpha digital document A.

The time stamp may preferably contain the actual time in question, for clarity, or may be a piece of information unambiguously associated with a time stamp that may be accessible online and specifying the time in question.

Such a register signature may also be applied to blocks of digital document register updates or posts, so that the information contained in such a block is sealed using a signature which is publicly published and also added to the digital document register as such in a subsequent post or block, such as using an additional column corresponding to the columns shown in FIG. 3.

To further increase security, the register signature may be calculated, using a suitable one-way function, also based upon a time-stamping signal of the above defined type. In particular, the digital register signature may be calculated additionally based upon a piece of public information which has been calculated based upon a publicly available source of information and using a one-way function.

As mentioned above, and in contrast to what is illustrated in FIGS. 2b/4b, 2d/4d, 2f/4f, 2g/3g/4g, 2h/4h and corresponding lines 2, 4, 6-8 of FIG. 3, it is preferred that a new asymmetric ownership key pair is provided and used for each amendment of the alpha digital document A, in other words for each registered alpha digital document A version.

This increases security in relation to ownership status of digital documents that exist in several versions. It is noted that a digital document A is preferably only considered "authentic" in its latest version. In other words, an additionally registered version of a digital document A overrides all previous versions of that same digital document A, such that an owner of a previous version is not necessarily the owner of the digital document A as such. Another way of expressing this is that ownership in the sense of the present invention preferably is relevant on digital document A level rather than on a digital document A version level.

Figure 7:
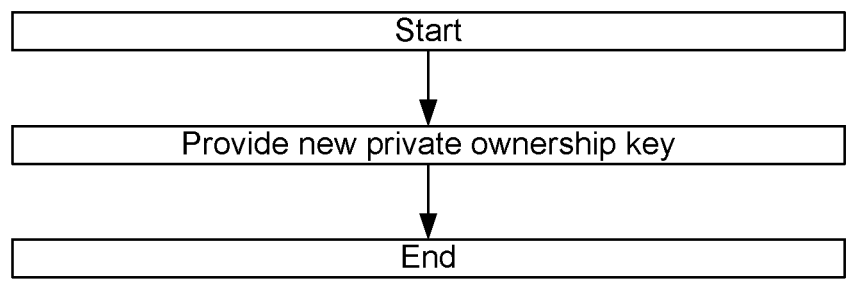
FIG. 7 is a flowchart showing a third method according to the invention.

FIGS. 2c/4c, 2e/4e, 2i/4i and the corresponding lines 3, 5 and 9 of FIG. 3 illustrate amendments in the form of a respective digital document ownership change, to a different owning party. Such an ownership change method, which may form part of the registration method described above in relation to FIG. 5, is illustrated in FIG. 7. In a first step, the method starts.

Then, in an additional step, the new private ownership key is provided to the different owning party. This may, for instance, take place by the new owning party itself producing the private ownership key and storing it for future reference. Then, the new owning party may also produce a corresponding public ownership key, which is then added to the digital document register as a part of the added post or line, and possibly also to the amended version of the alpha digital document A.

According to a preferred embodiment, an assignment transaction message is created and signed using the assigner's private ownership key, or is caused to comprise a signature, by the same key, of some other well-defined piece of information, and is communicated to the central server 110 from the assignor. The central server 110 may then verify the assignment transaction by verifying, using the previously stored public ownership key, that the assignor actually used the private ownership key to produce said signature, by a decrypting step of the signature using the corresponding public ownership key. Thereafter, if the signature verification turns out in the positive, the central server 110 stores the assignee's public ownership key for the alpha digital document A in question in the digital document register. The assignee's public ownership key may be comprised in said assignment transaction message, and may have been previously communicated from the assignee to the assignor.

Hence, the graphic representation shown in, for instance, FIG. 2c is, again, a purely appended version of the alpha digital document A in its preceding version (version 2), shown in FIG. 2b. To the previous version of the alpha digital document A, the following information has been appended at the end of the graphic representation:

The text "3", identifying the version number.

The text "Transfer", signalling to any interested party that this amendment is an ownership transfer-type amendment.

A current timestamp.

An endorsement text describing the intention of the ownership transfer "I hereby transfer possession of this original to Alice Smith."

Turning to FIG. 4c, the corresponding information is shown in the corresponding metadata, and also the new public ownership key ("OwnerKey"), calculated as described above, corresponding to the new private ownership key, which is not comprised in the alpha digital document A (corresponding to the above); a new private version key ("VersionKey"), calculated as described above; and an updated content hash ("ContentHash") of the above-described type.

A new document signature is also calculated, using the previous private ownership key and the new version of the alpha digital document A.

Correspondingly, FIG. 3 shows, in a third post or line with transaction identifier 3, the information added to the digital document register as result of the registration of the third version of the alpha digital document A, now with a new owner. The document identifier stays the same, while the content hash, the document signature ("Owner signature"), so ownership public key ("Owner key"), version public key ("Version key") and seal hash ("Ledger seal") are different between versions 2 and 3 of the document. It is noted that the new owner is not identified as such in the digital document register.

Since the new owner now controls the private ownership key corresponding to the public ownership key stored in the digital document register (and in the alpha digital document A itself in its version 3), the original owning party will not be able to provide a verifying signature as described above so as to prove legitimate ownership; however, the new owning party will be able to produce such a verifying signature.

In FIGS. 2d, 3 (line four) and 4d, respectively, it is shown how the new owner of the alpha digital document A introduces an append to the alpha digital document A, hence creating a new, amended version 4 of the alpha digital document A. As a result, the fields "Document hash", "Version key", "Owner signature", "Version signature", "Ledger signature" and "Ledger seal" are changed between transactions 3 and 4, whereas the "Owner key" stays the same (the owner of the alpha digital document A has not changed in this append operation).

FIGS. 2j, 3 (last line) and 4j illustrate another type of digital document A amendment which is registered in the digital document register, namely a cancellation of the alpha digital document A (transaction type "INV" for "invalidation"). This amendment is similar to the "APP" and "TRA" amendments, in that a pure append is added to the graphic representation of the alpha digital document A, as a reversible addition/append, illustrated in the graphic representation shown in FIG. 2j with the label "Invalidation" and in this example the text "Invalidated, document no longer legal". The metadata in FIG. 4j also comprises a new public ownership key, a new version key, and a new timestamp. However, after such a cancellation, no further amendments to the alpha digital document A are allowed by the central server 110 or the document registry.

Preferably, a public ownership key is recorded in the digital document register, under a cancelled version "10" of the alpha digital document A, which does not correspond to a valid private ownership key. In the example, the public key "00000000000000000000000000000000000000000000-00000000000000000000" is used. Preferably, this public key that does not correspond to a valid private ownership key is also stored in the alpha digital document A as such, which is illustrated in FIG. 4j. It may or may not be stored in the digital document register.

Since no party claiming to be the owner of the alpha digital document A after the cancellation will be able to produce the verifying signature matching the now stored public ownership key, the alpha digital document A in fact belongs to no-one, and is therefore invalid or cancelled. It is noted that the cancellation transaction as such may be verified by any interested party by a query to the central server 110, via interface 115.

Figure 8:
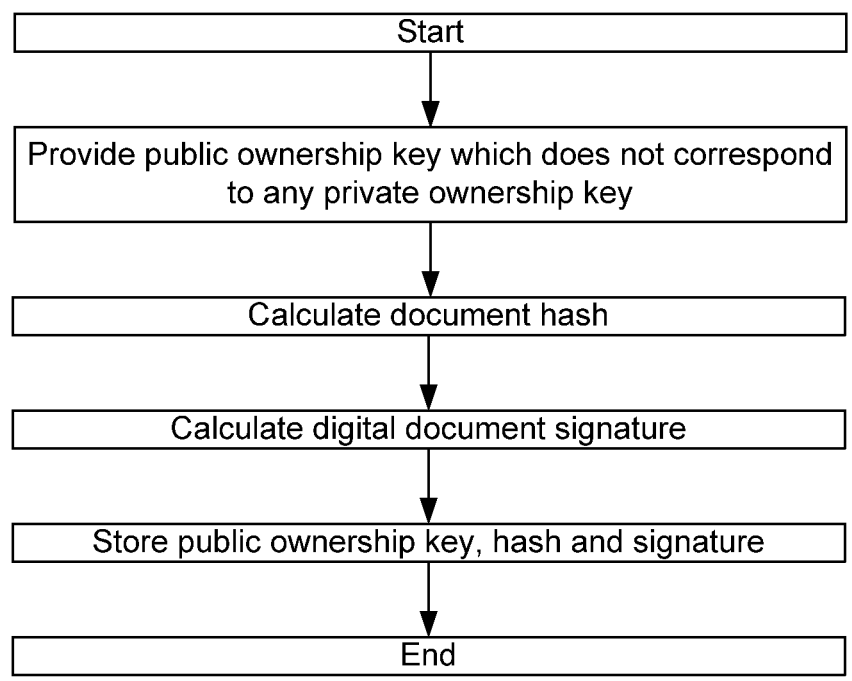
FIG. 8 is a flowchart showing a fourth method according to the invention.
Figure 9A:
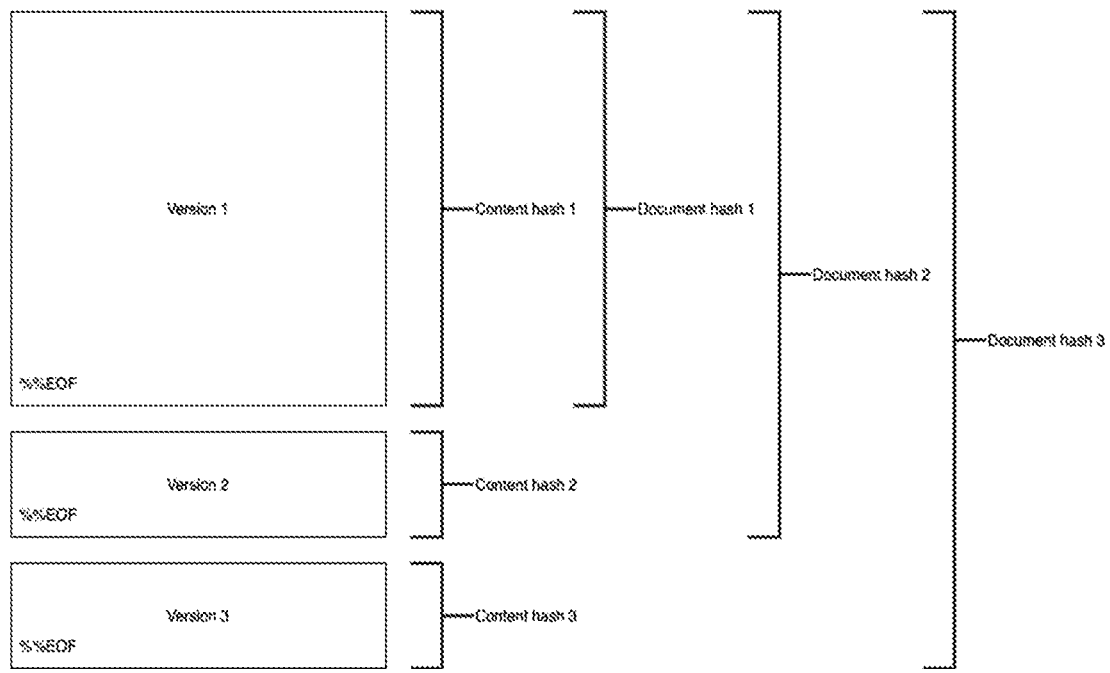
FIGS. 9*a* and 9*b* are two different exemplary conceptual views of how the different versions of two different exemplifying PDF document may be structured in different versions, along with corresponding content hash and document hash values in accordance with the below-described.
Figure 9B:
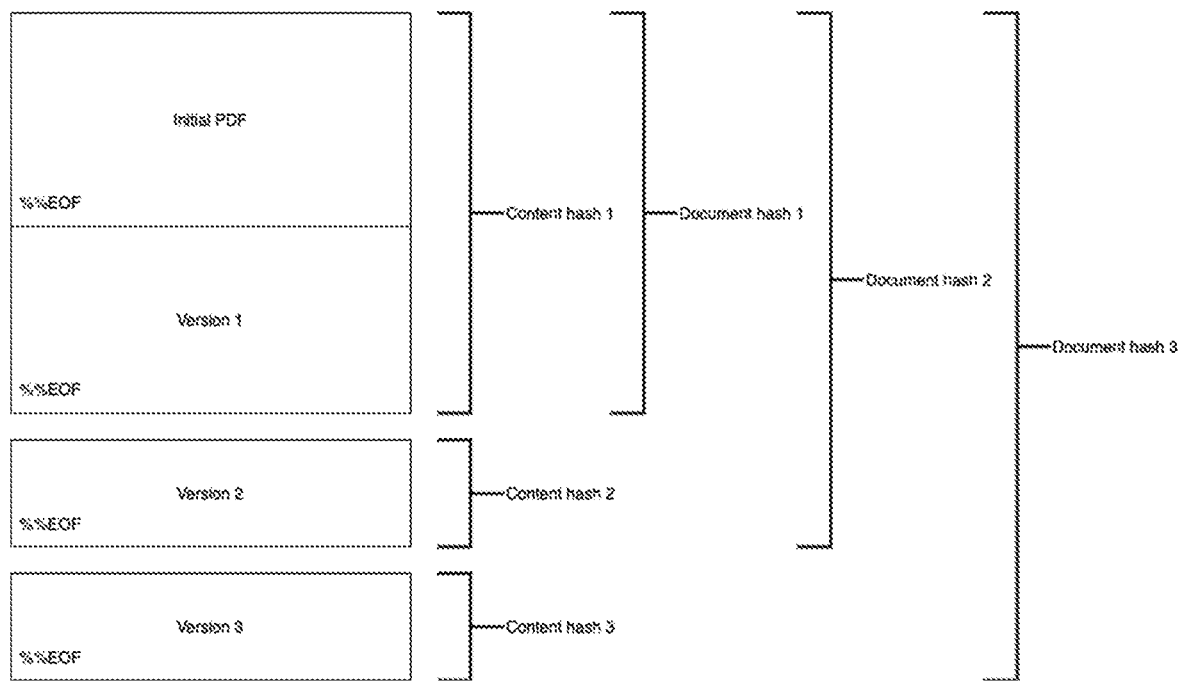

FIG. 8 illustrates the cancellation steps that may be taken, possibly as a continuation of the method steps illustrated in FIG. 5 taken before the method ends. In a first step, the method starts. Then, the said invalid public ownership key is provided. The document hash is calculated, and a document signature is calculated in the way outlined above, based upon the document hash. Thereafter, the invalid public ownership key is stored, together with at least the said hash and signature, in the digital document register.

As described above, for each digital document A, in all its potential respective versions, the metadata of the version in question may be in the form of plain text (even if stored in the digital document A in question in a processed format, as discussed above). This has the advantage that the metadata, after a possible decryption and/or decompression, is readily readable to humans, and also useful when being processed by the automated method using a system 100 of the type described herein. Preferably, all keys, signatures and hashes described herein that are stored in the metadata as such are preferably also written out in plain text in the corresponding way.

In particular, it is preferred that the metadata, for all versions of the alpha digital document A, comprises plain text information regarding a time stamp and/or the public ownership key; the content hash; and/or the version key, as described above. The document may also comprise information regarding the owning party identity.

Moreover, the metadata may be formatted according to a predetermined plain text document formatting standard, in particular a standard which is unambiguously and deterministically parsable by a machine parser, for instance a software-implemented parsing algorithm, so that such a parser is able to automatically extract various predetermined information parts from the metadata in question, such as the public ownership key.

In particular, it is preferred that the document formatting standard in question is a plain text format that does not require a document end tag. Suitable such formatting standards comprise the YML formatting standard, but not in general XML (since XML formatting requires an end tag). Since no end tag is required, the metadata for a later version of the alpha digital document A can be produced by simple pure additions at the end of the metadata for an immediately preceding version of the alpha digital document A, without having to reformat the metadata in any other way, such as reformatting the previous parts of the metadata contained in a later version, to adhere to the formatting standard. This maintains full integrity and trackability of the respective sets of metadata across different versions of the alpha digital document A. It is noted that FIGS. 4a-4j illustrate an alternative strategy, in which each set of metadata is stand-alone rather than containing the metadata of previous versions of the alpha digital document A.

One of the key aspects of the method and system according to the invention is that the digital document register does not comprise certain information. For instance, it is preferred that the digital document register does not comprise any information regarding the owning party to a particular digital document A. In fact, the activity of the digital document register and the central server 110 is preferably kept to a minimum in relation to the alpha digital document A itself. For instance, the central server 110 preferably does not have access to any of the digital documents A for which posts are stored in the digital document register, and preferably never changes the informational contents of such digital documents A. This results in that the digital document register does not contain any information which can be used by a malevolent party which is neither the owner, nor has access to any copy of a registered digital document A.

Furthermore, in some embodiments the central server 110 does no digital document format verification, but that the registering user is responsible for formatting the alpha digital document A according to the predetermined format described above, which may for instance comprise said metadata in YML format.

According to one preferred embodiment, a software function is provided by the system 100, such as by one or several of the central servers 110, 120, to user U computers 10, 20, 30. The software function may, for instance, be provided as a locally installable software application, a web service provided via a suitable interface, or similar, and may be arranged to allow such computers 10, 20, 30 to automatically perform specific tasks in relation to the system 100 and using the predetermined digital document format specified by the system 100. For instance, the software application may be arranged to automatically construct a properly formatted version of the alpha digital document A, according to said predetermined digital document formatting standard, based upon digital document A information comprising digital document payload information, a public ownership key and so forth; to automatically validate a digital document A by reading its public ownership key and public version key and querying the central server 110, via interface 115, regarding the validity of the digital document A in question, whether or not the digital document A has been compromised, whether or not it is the latest version of the digital document A, and so forth; and other automated document-specific tasks performed upon a manual command of a user U and/or upon an automatically produced command generated by a software-implemented algorithm. Preferably, the software application in question is provided by the system 100 and is automatically pushed or made available to all users of the system 100 when updated versions of the software application are available. This guarantees that all digital documents D registered in the digital document register always have a formatting which is compliant for automatic processing by all users to the system 100. The source code of the software application may also be made publicly available, so that all users to the system 100 may incorporate the same source code in internal digital document-processing software systems, and so that the digital document-processing aspects in relation to the system 100, after compilation of said source code, is uniformly applied and compliant with the predetermined communication standards defined by the system 100.

Furthermore, in some embodiments each post in the digital document register comprises a ledger signature, which is a signature calculated in a way corresponding to the above described signatures, using a private ledger key of a ledger key pair comprising the private ledger key and also a public ledger key. The ledger signature is preferably calculated based upon at least the previously registered post in the digital document register, such as based upon the information stored in said post itself.

Preferably, only the ledger operator authorized as the owner of the private ledger key may add new transactions to the ledger. This can be verified by any interested party by challenging a party adding a post to the digital document register to provide a signature of particular some piece of information using the private ledger key. Such a signature is then verifiable using the public ledger key, which may be publicly available. Ledger ownership may be historically verified using the ledger signature which is recorded in the digital document register for each post.

Furthermore, the current public ledger key may be enclosed, preferably in plain text, in the metadata of any version of the alpha digital document A registered in the digital document register. Then, the owner of each digital document may verify the legitimacy of the party operating the digital document register, and the whole system is therefore self-contained, only referencing itself.

The ledger signature recorded in a digital document register record may be furthermore returned by the central server 110, via interface 114, in connection to every digital document operation, and may also be registered in the digital document register (column "Ledger signature") in the digital document register for each such operation. This way, the ledger signature can be used to verify the legitimacy of the party operating the digital so document register after each digital document operation, using the ledger signature in combination with the available public ledger key.

If the private ledger key is lost, the party operating the digital document register can no longer add digital documents or digital document versions to the digital document register. This may lead to the digital document register being permanently locked for further digital document operations and a new ledger following on the previous with a new ledger public key could be started.

In some embodiments, a digital document A is only considered valid if it contains a valid (verifiable) current private document version key and a valid (verifiable) and current ledger signature.

In some embodiments, all users to the system 100 are required to run a central server 110, in turn keeping a copy of the digital document register. Then, such users (such as banks) can allow sub-users (such as bank employees) access to the central server in question via the user's computers 10, 20. In this case, it is preferred that a transaction in the digital document register is not deemed complete without the user's central server 110 first receiving a complete copy of the most current digital document register, with the transaction in question, for local storing in the central server 110 in question. Preferably, the user's central server 110 may be in communication with another central server 120, such as a peer central server or a central super-server serving several central sub-servers, from which other central server 120 the copy of the most updated digital document register is received. The transaction may be deemed complete only when the receiving central server 110 provides the sending central server 120 with a hash signifying a proof that all rows of the complete, or a subset (block) of, the received digital document has been properly verified and register this as a proof of the said reception of the updated copy of the digital document register.

In general, all key pairs used in the present invention are preferably of P-256 ECC algorithms, or higher security. No private keys are preferably ever transmitted between parties, central servers or any other entities. In general, all hashes calculated in the present invention are preferably calculated using a SHA-256, or higher security, one way function algorithm.

In practise, all API 114, 115 calls from clients 10, 20 to the server 110 may be encrypted, such as using e.g. standard internet Transport Layer Security (TLS) or the above described public ledger key, for increased security.

Above, preferred embodiments have been described. However, it is apparent to the skilled person that many modifications can be made to the disclosed embodiments without departing from the basic idea of the invention.

For instance, many other types of digital documents may be registered and processed using a system and a method of the type described herein.

The digital document register may comprise additional fields for each registered digital document or digital document version than the ones shown in the FIGS. 2a-2j and 4a-4j.

Everything which is said herein about the method according to the present invention is equally applicable to the system according to the invention, and vice versa.

Hence, the invention is not limited to the described embodiments, but can be varied within the scope of the enclosed claims.

The invention claimed is:

1. A method for registering and updating a plurality of electronic versions of a digital document, wherein for each version of the digital document, except for an initial version of the digital document, the following are stored in a digital document register and not stored in the digital document register are the versions of the digital document:
   a public ownership key corresponding to a private ownership key in an asymmetric cryptographic key pair;
   a digital document hash value calculated based on the version of the digital document; and
   a digital document signature of a hash of the version of the digital document, calculated using a previous private ownership key corresponding to a previous public ownership key in an asymmetric cryptographic key pair, the previous public ownership key being stored in the digital document register in relation to an immediately preceding version of the digital document,
   wherein the method comprises the steps:
   providing a first version of the digital document defined in a document description language so as to have a defined rendered graphic representation for the first version of the digital document;
   registering the first version of the digital document in the digital document register;
   providing a second version of the digital document by adding, in the document description language, a reversibly added part to the first version of the digital document, the reversibly added part being added in a way so that it is possible to unambiguously produce the first version of the digital document based only on the document description language and a content of the second version of the digital document, the second version of the digital document having a graphic representation thereof defined by the document description language and comprising a second set of metadata; and
   registering the second version of the digital document in the digital document register,
   wherein the second set of metadata is embedded as a part of the second version of the digital document without the embedding affecting the graphic representation for the second version of the digital document,
   wherein at least a part of the reversibly added part that affects the rendered graphic representation for the second version of the digital document can be unambiguously generated based on the second set of metadata, and
   wherein the registering of the second version of the digital document in the digital document register comprises calculating and storing in the digital document register a hash of the second set of metadata.

2. The method according to claim 1, wherein the first version of the digital document is the initial version of the digital document, and wherein the digital document signature is calculated using the private ownership key.

3. The method according to claim 1, wherein the registering of the second version of the digital document in the digital document register further comprises calculating and storing in the digital document register a hash of the reversibly added part.

4. The method according to claim 1, wherein the second set of metadata comprises a hash or signature of a part of the reversibly added part.

5. The method according to claim 4, wherein the part of the reversibly added part comprises an additional digital document incorporated into the digital document in the form of an attachment.

6. The method according to claim 1, wherein the first version of the digital document comprises a first set of metadata embedded as a part of the first version of the digital document without the embedding affecting the rendered graphic representation for the first version of the digital document.

7. The method according to claim 6, wherein the method comprises an initial step in which a base digital document is provided, wherein the base digital document comprises binary coded data, and wherein the digital document is constructed by adding the first set of metadata to the base digital document.

8. The method according to claim 7, wherein the base digital document is defined in the document description language.

9. The method according to claim 8, wherein the method further comprises generating the base digital document based on a source information by encoding the source information using the document description language.

10. The method according to claim 1, wherein the second set of metadata comprises a hash of at least one of the first set of metadata or a hash of the first version of the digital document.

11. The method according to claim 1, wherein at least one of the first or second metadata is provided as plaintext and added to the digital document either as plaintext data or in a processed form.

12. The method according to claim 1, wherein each graphic representation is arranged to be unambiguously produced from the document description language using a document description language interpreter piece of software to achieve the graphic representation.

13. The method according to claim 1, wherein the method further comprises the steps:
   e) restoring, based on the second version of the digital document, the first version of the digital document by reversing the addition of the reversibly added part;
   f) calculating a hash of the first version of the digital document and a hash of the second version of the digital document; and g) verifying both of the hashes against the corresponding hashes stored in the digital document register for the first and second versions of the digital document.

14. The method according to claim 1, wherein registering of the second version of the digital document in the digital document register further comprises also storing in the digital document register a public version key, the public version key is a public key in an asymmetric cryptographic key pair also comprising a corresponding private version key, and wherein the private version key is comprised in the second set of metadata.

15. The method according to claim 1, wherein the digital document is associated in the digital document register with all versions of the digital document, and wherein the information stored for each version of the digital document is retained in the digital document register when storing a further version of the digital document.

16. The method according to claim 1, wherein the method further comprises a repeated step in which a digital register signature is calculated based upon the digital document register, and wherein the digital register signature is publicly published.

17. The method according to claim 1, wherein a new asymmetric ownership key pair is provided and used for the second version of the digital document.

18. The method according to claim 17, wherein the second version of the digital document defines a change of document ownership to a different owning party, and wherein the method comprises the additional step of the different owning party controlling the new private ownership key.

19. The method according to claim 1, wherein the reversible addition of the first version results in a corresponding change in the graphic representation of the digital document the change being a pure append at an end of the graphic representation as compared to a graphic representation of the first version of the digital document.

20. A system for registering and updating a plurality of electronic versions of a digital document, the system comprising a logic unit and a database storing a digital document register, wherein for each version of the digital document, except for an initial version of the digital document, the following are stored in a digital document register and not stored in the digital document register are the versions of the digital document:

a public ownership key corresponding to a private ownership key in an asymmetric cryptographic key pair;

a digital document hash value calculated based on the version of the digital document; and a digital document signature of a hash of the version of the digital document, calculated using a previous private ownership key corresponding to a previous public ownership key in an asymmetric cryptographic key pair, the previous public owner ship key being stored in the digital document register in relation to an immediately preceding version of the digital document, wherein the logic unit is arranged to receive a first version of the digital document defined in a document description language so as to have a defined rendered graphic representation for the first version of the digital document;

register the first version of the digital document in the digital document register;

receive or produce a second version of the digital document, wherein the second version of the digital document is defined by adding, in the document description language, a reversibly added part to the first version of the digital document, the reversibly added part being added in a way so that it is possible to unambiguously produce the first version of the digital document based only on the document description language and a content of the second version of the digital document, the second version of the digital document having a graphic representation thereof defined by the document description language and comprising a second set of metadata; and register the second version of the digital document in the digital document register, wherein the second set of metadata is embedded as a part of the second version of the digital document without the embedding affecting the graphic representation for the second version of the digital document, wherein at least a part of the reversibly added part that affects the rendered graphic representation for the second version of the digital document can be unambiguously generated based on the second set of metadata, and wherein the registering of the second version of the digital document in the digital document register comprises calculating and storing in the digital document register a hash of the second set of metadata.

* * * * *